United States Patent
Wong et al.

(10) Patent No.: US 9,619,910 B2
(45) Date of Patent: *Apr. 11, 2017

(54) MAINTAINING GRAPHICAL PRESENTATIONS BASED ON USER CUSTOMIZATIONS

(71) Applicant: Microsoft Technology Licensing, LLC, Redmond, WA (US)

(72) Inventors: Karen K. Wong, Seattle, WA (US); Scott A. Sherman, Seattle, WA (US); Dawn Wright, Seattle, WA (US); Matthew J. Kotler, Kenmore, WA (US); Ilan Berker, Seattle, WA (US); Brent Gilbert, Woodinville, WA (US); Cynthia C. Shelly, Seattle, WA (US); Gary A. Pritting, Issaquah, WA (US); Kim Tapia St. Amant, Seattle, WA (US); Richard J. Wolf, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 869 days.

This patent is subject to a terminal disclaimer.

(21) Appl. No.: 13/621,614

(22) Filed: Sep. 17, 2012

(65) Prior Publication Data

US 2013/0024791 A1 Jan. 24, 2013

Related U.S. Application Data

(63) Continuation of application No. 13/362,879, filed on Jan. 31, 2012, now Pat. No. 8,269,790, which is a
(Continued)

(51) Int. Cl.
*G06T 11/60* (2006.01)
*G06T 11/20* (2006.01)

(52) U.S. Cl.
CPC ............ *G06T 11/60* (2013.01); *G06T 11/206* (2013.01)

(58) Field of Classification Search
CPC .................................. G06T 11/60; G06T 11/206
See application file for complete search history.

(56) References Cited

U.S. PATENT DOCUMENTS

| 4,531,150 A | 7/1985 | Amano |
| 4,686,522 A | 8/1987 | Hernandez et al. |

(Continued)

FOREIGN PATENT DOCUMENTS

| CN | 1530833 A | 9/2004 |
| EP | 0 431 638 A1 | 6/1991 |

(Continued)

OTHER PUBLICATIONS

U.S. Appl. No. 10/957,103, Amendment and Response filed Dec. 14, 2012, 14 pgs.

(Continued)

*Primary Examiner* — Jeffrey Chow

(57) ABSTRACT

A method and system for rendering graphics based on user customizations in a computer graphics application are disclosed. The customizations relate to various properties of one or more graphical elements in the graphic. Such properties include positioning, size, formatting and other visual attributes associated with the graphical elements. These properties may be defined as either semantic properties or presentation properties. Semantic properties are persistent across all graphic definitions. Presentation properties are specific to the graphic definition to which each particular graphic belongs. Thus, a customization to a semantic property of a displayed graphic is preserved in memory for application not only to the currently displayed graphic, but also to all other graphic definitions that may be displayed in the future. In contrast, a customization to a presentation property is only preserved for the currently displayed graphic, and thus not preserved for all other graphic definitions.

20 Claims, 8 Drawing Sheets

Related U.S. Application Data continuation of application No. 11/013,655, filed on Dec. 15, 2004, now Pat. No. 8,134,575, which is a continuation-in-part of application No. 10/957,103, filed on Sep. 30, 2004, now Pat. No. 8,510,657.

(56) References Cited

U.S. PATENT DOCUMENTS

| | | |
|---|---|---|
| 4,996,665 A | 2/1991 | Nomura |
| 5,214,755 A | 5/1993 | Mason |
| 5,426,729 A | 6/1995 | Parker |
| 5,509,112 A | 4/1996 | Doi et al. |
| 5,535,134 A | 7/1996 | Cohn et al. |
| 5,557,722 A | 9/1996 | DeRose et al. |
| 5,596,691 A | 1/1997 | Good et al. |
| 5,619,631 A | 4/1997 | Schott |
| 5,649,216 A | 7/1997 | Sieber |
| 5,669,006 A | 9/1997 | Joskowicz et al. |
| 5,732,229 A | 3/1998 | Dickinson |
| 5,818,447 A | 10/1998 | Wolf et al. |
| 5,867,386 A | 2/1999 | Hoffberg et al. |
| 5,872,867 A | 2/1999 | Bergen |
| 5,903,902 A | 5/1999 | Orr et al. |
| 5,909,220 A | 6/1999 | Sandow |
| 5,956,043 A | 9/1999 | Jensen |
| 5,956,737 A | 9/1999 | King et al. |
| 5,999,731 A | 12/1999 | Yellin et al. |
| 6,057,842 A | 5/2000 | Knowlton et al. |
| 6,057,858 A | 5/2000 | Desrosiers |
| 6,072,480 A | 6/2000 | Gorbet et al. |
| 6,081,816 A | 6/2000 | Agrawal |
| 6,161,098 A | 12/2000 | Wallman |
| 6,166,738 A | 12/2000 | Robertson et al. |
| 6,173,286 B1 | 1/2001 | Guttman et al. |
| 6,189,132 B1 | 2/2001 | Heng et al. |
| 6,204,849 B1 | 3/2001 | Smith |
| 6,204,859 B1 | 3/2001 | Jouppi et al. |
| 6,256,650 B1 | 7/2001 | Cedar et al. |
| 6,289,502 B1 | 9/2001 | Garland et al. |
| 6,289,505 B1 | 9/2001 | Goebel |
| 6,292,194 B1 | 9/2001 | Powell, III |
| 6,301,704 B1 | 10/2001 | Chow et al. |
| 6,305,012 B1 | 10/2001 | Beadle et al. |
| 6,308,322 B1 | 10/2001 | Serocki et al. |
| 6,320,602 B1 | 11/2001 | Burkardt et al. |
| 6,324,686 B1 | 11/2001 | Komatsu et al. |
| 6,405,225 B1 | 6/2002 | Apfel et al. |
| 6,448,973 B1 | 9/2002 | Guo et al. |
| 6,593,933 B1 | 7/2003 | Xu et al. |
| 6,667,750 B1 | 12/2003 | Halstead et al. |
| 6,691,282 B1 | 2/2004 | Rochford et al. |
| 6,715,130 B1 | 3/2004 | Eiche et al. |
| 6,774,899 B1 | 8/2004 | Ryall et al. |
| 6,819,342 B2 | 11/2004 | Kitagawa et al. |
| 6,826,727 B1 | 11/2004 | Mohr et al. |
| 6,826,729 B1 | 11/2004 | Giesen et al. |
| 6,944,830 B2 | 9/2005 | Card et al. |
| 6,956,737 B2 | 10/2005 | Chen et al. |
| 6,957,191 B1 | 10/2005 | Belcsak et al. |
| 7,055,095 B1 | 5/2006 | Anwar |
| 7,107,525 B2 | 9/2006 | Purvis |
| 7,178,102 B1 | 2/2007 | Jones et al. |
| 7,209,815 B2 | 4/2007 | Grier et al. |
| 7,231,602 B1 | 6/2007 | Trulove |
| 7,325,186 B2 | 1/2008 | Jones |
| 7,348,982 B2 | 3/2008 | Schorr et al. |
| 7,379,074 B2 | 5/2008 | Gerhard et al. |
| 7,406,660 B1 | 7/2008 | Sikchi |
| 7,423,646 B2 | 9/2008 | Saini et al. |
| 7,478,079 B2 | 1/2009 | Robertson |
| 7,743,325 B2 | 6/2010 | Berker et al. |
| 7,747,944 B2 | 6/2010 | Gerhard et al. |
| 7,750,924 B2 | 7/2010 | Berker |
| 8,134,575 B2 | 3/2012 | Wong et al. |
| 8,269,790 B2 | 9/2012 | Wong et al. |
| 2001/0035875 A1 | 11/2001 | Suzuki et al. |
| 2001/0051962 A1 | 12/2001 | Plotkin |
| 2002/0065852 A1 | 5/2002 | Hendrickson et al. |
| 2002/0107842 A1 | 8/2002 | Biebesheimer et al. |
| 2002/0111969 A1 | 8/2002 | Halstead, Jr. |
| 2003/0065601 A1 | 4/2003 | Gatto |
| 2003/0069931 A1 | 4/2003 | Omura |
| 2003/0079177 A1 | 4/2003 | Brintzenhofe et al. |
| 2003/0218641 A1 | 11/2003 | Longobardi |
| 2004/0041838 A1 | 3/2004 | Adusumilli et al. |
| 2004/0111672 A1 | 6/2004 | Bowman et al. |
| 2004/0133854 A1 | 7/2004 | Black |
| 2004/0145603 A1 | 7/2004 | Soares |
| 2004/0148571 A1 | 7/2004 | Lue |
| 2004/0205602 A1 | 10/2004 | Croeni |
| 2005/0001837 A1 | 1/2005 | Shannon |
| 2005/0007382 A1 | 1/2005 | Schowtka et al. |
| 2005/0034083 A1 | 2/2005 | Jaeger |
| 2005/0091584 A1 | 4/2005 | Bogdan et al. |
| 2005/0094206 A1 | 5/2005 | Tonisson |
| 2005/0094207 A1 | 5/2005 | Lo et al. |
| 2005/0132283 A1 | 6/2005 | Diwan et al. |
| 2005/0157926 A1 | 7/2005 | Moravec et al. |
| 2005/0216832 A1 | 9/2005 | Giannetti |
| 2005/0240858 A1 | 10/2005 | Croft et al. |
| 2005/0273730 A1 | 12/2005 | Card et al. |
| 2005/0289466 A1 | 12/2005 | Chen |
| 2006/0064642 A1 | 3/2006 | Iyer |
| 2006/0066627 A1 | 3/2006 | Gerhard et al. |
| 2006/0066631 A1 | 3/2006 | Schorr et al. |
| 2006/0066632 A1 | 3/2006 | Wong |
| 2006/0070005 A1 | 3/2006 | Gilbert |
| 2006/0209093 A1 | 9/2006 | Berker et al. |
| 2006/0212801 A1 | 9/2006 | Berker et al. |
| 2006/0277476 A1 | 12/2006 | Lai |
| 2006/0294460 A1 | 12/2006 | Chao et al. |
| 2007/0006073 A1 | 1/2007 | Gerhard et al. |
| 2007/0055939 A1 | 3/2007 | Furlong et al. |
| 2007/0112832 A1 | 5/2007 | Wong |
| 2007/0186168 A1 | 8/2007 | Waldman et al. |
| 2008/0046803 A1 | 2/2008 | Beauchamp et al. |
| 2008/0136822 A1 | 6/2008 | Schorr et al. |
| 2008/0178107 A1 | 7/2008 | Lee et al. |
| 2008/0282147 A1 | 11/2008 | Schorr |
| 2008/0288916 A1 | 11/2008 | Tazoe |
| 2009/0019453 A1 | 1/2009 | Kodaganur |
| 2009/0119577 A1 | 5/2009 | Almbladh |
| 2009/0327954 A1 | 12/2009 | Danton |
| 2011/0055687 A1 | 3/2011 | Bhandar et al. |
| 2011/0225548 A1 | 9/2011 | Callens et al. |
| 2012/0127178 A1 | 5/2012 | Wong et al. |
| 2013/0232410 A1 | 9/2013 | Waldman et al. |
| 2013/0290839 A1 | 10/2013 | Gilbert et al. |
| 2014/0289613 A1 | 9/2014 | Callens et al. |
| 2014/0292767 A1 | 10/2014 | Schorr et al. |

FOREIGN PATENT DOCUMENTS

| | | |
|---|---|---|
| EP | 1 111 543 A2 | 6/2001 |
| EP | 1 111 543 A3 | 11/2002 |
| EP | 1643450 | 5/2012 |
| JP | 04-130585 A | 5/1992 |
| JP | H06-309128 | 11/1994 |
| JP | H09-109351 | 4/1997 |
| JP | 2001-500294 | 1/2001 |
| JP | 2002507289 A | 3/2002 |
| JP | 2002507301 A | 3/2002 |
| JP | 2003-052582 | 2/2003 |
| JP | 2003044464 A | 2/2003 |
| JP | 2004-220561 | 8/2004 |
| JP | 2005-275890 | 12/2005 |
| JP | 2006-506713 A | 2/2006 |
| KR | 10-1999-0029911 | 4/1999 |
| KR | 10-1999-0034152 A | 5/1999 |
| KR | 10-2004-0041979 | 5/2004 |
| KR | 10-2004-0048236 A | 6/2004 |
| KR | 1020040073870 | 8/2004 |
| MX | 277871 | 7/2010 |
| RU | 2142162 | 11/1999 |

(56) References Cited

FOREIGN PATENT DOCUMENTS

| RU | 2218602 C2 | 12/2003 |
|---|---|---|
| TW | 578067 | 3/2004 |
| TW | 200406734 A | 5/2004 |
| WO | WO 8200726 | 3/1982 |
| WO | WO 95/00916 | 1/1995 |
| WO | WO 9855953 | 10/1998 |
| WO | 9924267 | 5/1999 |
| WO | WO 01/39019 A2 | 11/2000 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

U.S. Appl. No. 11/351,341, Amendment and Response filed Dec. 12, 2012, 9 pgs.
U.S. Appl. No. 10/957,103, Office Action mailed Jan. 3, 2013, 7 pgs.
U.S. Appl. No. 11/351,341, Notice of Allowance mailed Jan. 2, 2013, 22 pgs.
Canadian Notice of Allowance in Application 2517409, mailed Sep. 20, 2013, 1 page.
Canadian Examiner's Report in Application 2517399, mailed Nov. 29, 2013, 4 pgs.
Malaysian Notice of Allowance in Application PI 20054064, mailed Oct. 31, 2013, 2 pgs.
Eunsoon Choi, "A Study on Instruction for Statistics & Probability through Excel Utilization" published on Aug. 2002 as a master's thesis submitted to the graduate school of education, no English translation available, Silla University, Korea, 75 pgs.
Korean Notice of Preliminary Rejection in Application (with English translation), in Application 10-2005-73848, mailed Nov. 18, 2013, 8 pgs.
Malaysian Notice of Allowance in Application PI 20054063, mailed Jul. 15, 2013, 2 pgs.
Indian Office Action in Application 2284/DEL/2005, mailed Feb. 17, 2015, 2 pgs.
Canadian Office Action in Application 2511037, mailed Nov. 14, 2012, 3 pgs.
U.S. Appl. No. 12/035,878, Final Office Action mailed Nov. 16, 2012, 32 pgs.
U.S. Appl. No. 12/035,878, Amendment and Response filed Feb. 21, 2013, 14 pgs.
Malaysian Adverse Report in Application PI20054064, mailed Jan. 15, 2013, 2 pgs.
U.S. Appl. No. 10/957,103, Amendment and Response filed Mar. 22, 2013, 16 pgs.
Canadian Office Action in Application 2517399, mailed Mar. 22, 2013, 2 pgs.
Chinese Decision on Re-Examination in Application 201010587370.1, mailed Apr. 7, 2013, 2 pgs.
Canadian Office Action in Application 2517409, mailed Feb. 11, 2013, 6 pgs.
U.S. Appl. No. 12/035,878, Amendment filed Apr. 22, 2014, 3 pgs.
U.S. Appl. No. 12/723,127, Amendment filed Apr. 22, 2014, 1 pg.
U.S. Appl. No. 10/957,103, Amendment and Response filed May 3, 2013, 3 pgs.
U.S. Appl. No. 12/035,878, Office Action mailed May 28, 2013, 31 pgs.
Canadian Notice of Allowance in Application 2511037, mailed May 29, 2013, 1 page.
Taiwan Notice of Allowance in Application 94126264, mailed Jun. 10, 2013, 4 pgs.
Canadian Notice of Allowance in Application 2517399, mailed Sep. 5, 2014, 2 pgs.
U.S. Appl. No. 12/035,878, Amendment and Response filed Sep. 5, 2013, 14 pgs.
U.S. Appl. No. 12/723,127, Notice of Allowance mailed Aug. 8, 2013, 9 pgs.
Chinese 3rd Office Action in Application 201010587370.1, mailed Aug. 8, 2013, 8 pgs.
Japanese Notice of Allowance in Application 2011-245199, mailed Jul. 17, 2013, 4 pgs.
"Create Diagrams in Word 2002, Excel 2002, and Powerpoint 2002"; http://office.microsoft.com/en-usassistance/HA-010346141033.aspx.; 2 pages.
"de Mail reader," downloaded Mar. 24, 2009, 2 pages. URL: http://de.openoffice.org/services/ReadMMsg?list=annouce&msg. No translation available, 2 pgs.
"Internet as a Source of Prior Art," downloaded Mar. 16, 2009 from Wikipedia, 3 pages. URL: http//en.wikipedia.org/wiki/Internet_as_a_source_of_prior_art, downloaded Mar. 24, 2009 (in German) 3 pages.
"OpenOffice.org 1.0.3.1 in deutsch veroffentlicht," downloaded Mar. 24, 2009, (in German), 4 pages.
"OpenOffice.org," downloaded Mar. 24, 2009; 19 pages. "OpenOffice.org," downloaded Mar. 24, 2009 (as cited as D8 in the Minutes from Oral Proceedings dated Jun. 8, 2009—in German, no translation available); 19 pages. URL: http://www.ooo-portal.de/modules.pnp?op=modload&name=News&.
"Exploring the Layouts", 1999 software Publishing Corporation, 2 pgs.
"Proquis Compliance Management & Document Control Solutions"; http://wwws.proquis.com/allclear-text2chart.asp, 1 page.
"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.
A. C. Beers et al., "Rendering from Compressed Textures," Proceedings of SIGGRAPH '96, Aug. 1996, 4 pgs.
A. Fournier et al., "Computer Rendering of Stochastic Models," Communications of the ACM, Jun. 1982, vol. 25, No. 6, pp. 371-384.
Anonymous: "Extract of Online-Help for OpenOffice Impress (Stylist), Ver. 1.1.5, German Version, "online! Apr. 2004, 2 pgs.
Australian Examiner's First Report dated Apr. 21, 2010 cited in Application No. 2005203708, 2 pgs.
Australian Examiner's First Report filed in Application No. 2005202720, dated Apr. 22, 2010; 2 pages.
Australian Examiner's Second Report filed in Application No. 2005202720, dated Aug. 30, 2010; 2 pages.
Australian Notice of Allowance in Application 2005202720 mailed Feb. 10, 2011, 3 pgs.
Australian Notice of Allowance in Application 2005203708 mailed Jun. 23, 2010, 3 pgs.
Australian Notice of Allowance in Application 2005203711 mailed Nov. 9, 2010, 3 pgs.
Australian Office Action in Application 2005203711 mailed Apr. 23, 2010, 2 pgs.
Borland, Russell "Running Microsoft Word 97", 1997, Published by Microsoft Press, Pertinent pp. 60-61 (0247us01).
Bugfix-Release OpenOffice 1.0.3.1, Erschienen (Update), no English translation, Apr. 23, 2003, 1 page.
Casex Annex, dated Apr. 11, 2010 (cited in email communication from European Examiner on May 12, 20011 in European Application 05105366.8); 1 page.
Chinese 1st Office Action in Application 200510088525.6 mailed May 9, 2008, 18 pgs.
Chinese 1st Office Action in Application 200510099124.0 mailed Jun. 20, 2008, 19 pgs.
Chinese 2nd Office Action in Application 200510088525.6 mailed Nov. 7, 2008, 10 pgs.
Chinese 2nd Office Action in Application 200510099124.0 mailed Dec. 26, 2008, 9 pgs.
Chinese 3rd Office Action in Application 200510088525.6 mailed Feb. 27, 2009, 9 pgs.
Chinese 3rd Office Action in Application 200510099124.0 mailed Apr. 17, 2009, 16 pgs.
Chinese First Office Action in Application 201010587370.1, mailed Sep. 8, 2011, 8 pgs.
Chinese Fourth Office Action cited in Application No. 200510099124.0, dated Sep. 4, 2009, 7 pages.

(56) References Cited

OTHER PUBLICATIONS

Chinese Notice of Allowance in Application 200510088525.6 mailed Jul. 17, 2009, 4 pgs.
Chinese Notice of Allowance in Application 200510099124.0 mailed Sep. 15, 2010, 4 pgs.
Chinese Notice of Allowance in Application 2006100044984 mailed Jan. 22, 2010, 2 pgs.
Chinese Notice of Allowance in Application No. 200510099652.6, mailed Dec. 26, 2008, 4 pgs.
Chinese Office Action dated Aug. 29, 2008 cited in Application No. 2006100044498.4, 15 pgs.
Chinese Office Action dated Jul. 4, 2008 cited in Application No. 200510099652.6, 9 pgs.
Chinese Patent Office Sixth [sic—Fifth] Office Action cited in Application No. 200510099124.0, dated May 10, 2010, 6 pages.
Chinese Second Office Action dated Feb. 20, 2009 cited in Application No. 2006100044498.4, 19 pgs.
Chinese Third Office Action dated Jun. 19, 2009 cited in Application No. 2006100044498.4, 9 pgs.
Chou-Zukai, "Excel 2002, Windows XP General Edition", pp. 210-225 (2002) (cited in Japanese Patent Application No. 2005-187817, no translation available), in Japanese language, 18 pgs.
css Zen Garden, "The Beauty in CSS Design", retrieved from Archive.org. <http://web.archive.org/web/20031001180317/http://www.csszengarden.com/>, Oct. 1, 2003. Retrieved Nov. 8, 2009.
D. J. Heeger et al., "Pyramid-Based Texture Analysis/Synthesis," pp. 1-10.
D. R. Peachey, "Solid Texturing of Complex Surfaces," Computer Graphics, vol. 19, No. 3, Jul. 1985, pp. 279-286.
DeBonet, JS, "Multiresolution Sampling Procedure for Analysis and Synthesis of Texture Images", Learning & Vision Group, Artificial Intelligence Laboratory, Massachusetts Institute of Technology, 8 pgs.
Diagram, Oxford English Dictionary, 2nd Edition (1989), Oxford University Press 1989, downloaded from http://www.oed.com/oed/00063080 (cited in email communication from European Examiner on May 12, 20011 in European Application 05105366.8); 2 pgs.
Diagramm—Wikipedia (in German), downloaded from http://de.wikipedia.org/wiki/Diagramm (cited in email communication from European Examiner on May 12, 20011 in European Application 05105366.8); 10 pgs.
European Communication dated Dec. 17, 2008 cited in Application No. 06111105.0, 8 pgs.
European Communication dated Jul. 10, 2009 cited in Application No. 06111105.0, 6 pgs.
European Decision to Refuse a European Application dated Jun. 12, 2009 in Application No. 05108636.1, 39 pages.
European E-mail communication from European Examiner cited in EP Application 05105366.8 dated May 12, 2011, 2 pgs.
European Exam Report in EP Application 05105366.8 mailed Apr. 30, 2009, 9 pgs.
European Extended Search Report for EP 05 10 8636.1-2218, Jan. 2, 2006, 7 pgs.
European Minutes from Oral Proceedings, dated Jun. 8, 2009, in EP Application No. 05108636.1, 42 pages.
European Notice of Allowance in Application 05105366.8 mailed Jun. 21, 2011, 6 pgs.
European Official Communication in EP Application 051086361 mailed Jun. 1, 2007, 7 pgs.
European Search Report dated Feb. 13, 2006 cited in Application 05108658.5, 7 pgs.
European Search Report for EP 05105366.8, Jan. 2, 2006, 3 pgs.
Gallant, John and Bergevin, Holly, Archive.org archive of "CSS Flyouts—Part One," [online] Jun. 24, 2005 [accessed Nov. 13, 2006], CommunityMX, Retrieved from Internet <URL:http://web.archive.org/web/20050624075147/http://www.communitymx.com/content/article.cfm?p.=3&cid=55A69>.
H.G. Schuster, "Deterministic Chaos, An Introduction," Second Revised Edition, pp. 200-207.

Heise Online: "OpenOffice 1.1.5 verfugbar" downloaded Jul. 28, 2010 (as cited as D5 in the Minutes from Oral Proceedings dated Jun. 8, 2009—in German, URL: http://www.heise.de/newsticker/meldung/OpenOffice-1-1-5-verfuegbar-130148.html English translation attached); 2 pages.
Isayama, K.' "SMI Edicolor 5", Mac Power, vol. 12, No. 4, pp. 134-135, Apr. 1, 2001, 7 pgs.
Torborg et al., "Talisman: Commodity Realtime 3D Graphics for the PC," Proceedings of SIGGRAPH 1996, 11 pgs.
J.P. Lewis, "Algorithms for Solid Noise Synthesis," Computer Graphics, vol. 23, No. 3, Jul. 1989, pp. 263-270.
Japanese Final Notice of Rejection dated Aug. 10, 2011 in Application 2006-064583, 3 pgs.
Japanese Final Rejection and Translation Summary in Application 2006064583, mailed Dec. 1, 2011, 4 pgs.
Japanese Notice of Allowance in JP Application 2005-275890, mailed Oct. 5, 2011, 5 pgs.
Japanese Office Action dated Apr. 12, 2011 cited in JP Application 2005-253627, 5 pgs.
Japanese Official Notification of patent published in Official Gazette in Application 2005-187817, mailed Dec. 7, 2011, 32 pgs.
Japanese Patent Office Notice of Rejection cited in Application No. 2005187817, dated Nov. 11, 2010; 5 pages.
Japanese Patent Office Notice of Rejection cited in Application No. 2005275890, dated Nov. 18, 2010; 9 pages.
K. Perlin, "An Image Synthesizer," Computer Graphics, vol. 19, No. 3, Jul. 1985, pp. 287-296.
Korean Notice of Preliminary Rejection and Translation Summary in Application 10200573848, mailed Dec. 12, 2011, 6 pgs.
LingCh by Elod Csirmaz—Retrieved Date: Jan. 11, 2010, http://www.postminart.org/csirmaz/lingch.txt., 5 pgs.
Linuxforen.de, "OpenOffice.org 1.0.3.1 in deutsch veröffentlicht," downloaded Mar. 24, 2009 (as cited as D6 in the Minutes from Oral Proceedings dated Jun. 8, 2009—in German, no translation available); 3 pages.
M. Cox et al., "Multi-Level Texture Caching for 3D Graphics Hardware," In Proceedings of the 25th International Symposium on Computer Architecture, 1998, pp. 86-97.
M. Pharr et al., "Rendering Complex Scenes with Memory-Coherent Ray Tracing," Proceedings of SIGGRAPH 1997, pp. 1-8.
Malaysian Adverse Report in Application PI20054064, mailed Nov. 15, 2011, 3 pgs.
Malaysian Examination Report in Application PI 20054063, mailed Sep. 15, 2011, 3 pgs.
Mexican Office Action dated Dec. 4, 2008 cited in Application No. PA/a/2005/009276 (not in English), 4 pgs.
Mexican Office Action dated May 25, 2009 cited in Application No. PA/a/2005/009276 (60001.0423MX01), 10 pgs.
Minoru Sendagi, "Word 2003 Perfect Master, Windows XP Kanzentaiou", pp. 500-507, 2003, 10 pgs.
Online Training Solutions, Inc et al., "Microsoft Office PowerPoint 2003 Step by Step", Microsoft Press, Aug. 27, 2003, 105 pgs.
P. Hanrahan et al., "A Language for Shading and Lighting Calculations," Computer Graphics, vol. 24, No. 4, Aug. 1990, pp. 289-298.
R.L. Cook et al., "The Reyes Image Rendering Architecture," Computer Graphics, vol. 21, No. 4, Jul. 1987, pp. 95-102.
Russian Notice of Allowance in Application 2005130349 mailed Oct. 30, 2009, 7 pgs.
Russian Notice of Allowance in Application 2005130361 mailed Oct. 7, 2009, 16 pgs.
Russian Notice of Allowance in RU application 2005120365 mailed Oct. 6, 2009, 4 pgs.
Screen Shots (Examiner generated) taken on Mar. 18, 2010 of Microsoft PowerPoint 2002, publicly released Mar. 5, 2001); cited in U.S. Appl. No. 11/013,655, 6 pgs.
Screen shots of Microsoft PowerPoint, 2002, (cited by Examiner in U.S. Appl. No. 11/013,655 on Jan. 9, 2009), 15 pgs.
Screen shots of Microsoft PowerPoint, 2002, taken at Oct. 9, 2010, 6 pgs.

(56) References Cited

OTHER PUBLICATIONS

Singleton, Roderick, "OpenOffice.org User Guide for Version 1.1. X", May 7, 2004, Online, XP002348571; retrieved from the Internet: URL: www.openoffice.org>, retrieved Sep. 30, 2005; pp. 253-284.
Styling Nested Lists, [online] Oct. 19, 2003 [accessed Nov. 13, 2006], SimpleBits, LLC, Retrieved from Internet<URL:http://www.simplebits.com/ notebook/2003/10/19/styling_nested_lists.html/> pp. 1-5.
T. Apodoca, "Using RenderMan in Animation Production," SIGGRAPH 1995, Course 4, 41 pgs.
Taiwan Search Report in Application 094127756, mailed Jan. 3, 2012, 1 pg.
U.S. Appl. No. 09/578,574, Office Action mailed Oct. 23, 2001, 16 pgs.
U.S. Appl. No. 10/955,271, Advisory Action mailed Jan. 9, 2007, 3 pgs.
U.S. Appl. No. 10/957,103, Advisory Action mailed Jan. 17, 2008, 3 pgs.
U.S. Appl. No. 10/957,103, Amendment and Response filed Jan. 23, 2008, 19 pgs.
U.S. Appl. No. 10/957,103, Amendment and Response filed Nov. 18, 2009, 28 pgs.
U.S. Appl. No. 10/957,103, Amendment and Response filed Nov. 23, 2010, 23 pgs.
U.S. Appl. No. 10/957,103, Amendment and Response filed Dec. 12, 2008, 17 pgs.
U.S. Appl. No. 10/957,103, Amendment and Response filed Dec. 26, 2007, 18 pgs.
U.S. Appl. No. 10/957,103, Amendment and Response filed Apr. 14, 2009, 24 pgs.
U.S. Appl. No. 10/957,103, Amendment and Response filed Jun. 15, 2010, 24 pgs.
U.S. Appl. No. 10/957,103, Amendment and Response filed Jun. 17, 2008, 16 pgs.
U.S. Appl. No. 10/957,103, Amendment and Response filed Jul. 8, 2011, 21 pgs.
U.S. Appl. No. 10/957,103, Amendment and Response filed Aug. 16, 2007, 17 pgs.
U.S. Appl. No. 10/957,103, Amendment filed Jan. 27, 2012, 26 pgs.
U.S. Appl. No. 10/957,103, Final Office Action mailed Sep. 27, 2011, 19 pgs.
U.S. Appl. No. 10/957,103, Office Action mailed Apr. 13, 2011, 19 pgs.
U.S. Appl. No. 11/013,630, Office Action mailed Jan. 22, 2008, 2 pgs.
U.S. Appl. No. 11/013,630, Petition dated Mar. 17, 2008, 2 pgs.
U.S. Appl. No. 11/013,630, Petition Decision dated Mar. 18, 2008, 1 page.
U.S. Appl. No. 11/013,630, Petition Decision dated Jul. 21, 2008, 1 page.
U.S. Appl. No. 11/013,655, Amendment and Response filed Jan. 24, 2011, 16 pgs.
U.S. Appl. No. 11/013,655, Amendment and Response filed Oct. 14, 2008, 14 pgs.
U.S. Appl. No. 11/013,655, Amendment and Response filed Nov. 18, 2009, 15 pgs.
U.S. Appl. No. 11/013,655, Amendment and Response filed May 11, 2009, 17 pgs.
U.S. Appl. No. 11/013,655, Amendment and Response filed Aug. 11, 2008, 13 pgs.
U.S. Appl. No. 11/013,655, Amendment and Response filed Aug. 24, 2010, 21 pgs.
U.S. Appl. No. 11/013,655, Notice of Allowance mailed Jan. 7, 2011, 5 pgs.
U.S. Appl. No. 11/013,655, Office Action mailed Oct. 25, 2010, 15 pgs.
U.S. Appl. No. 11/081,323, Advisory Action mailed Sep. 18, 2007, 3 pgs.
U.S. Appl. No. 11/081,324, Examiner's Amendment Communication mailed Aug. 12, 2009, 2 pgs.
U.S. Appl. No. 11/081,324, Examiner's Amendment Communication mailed Aug. 4, 2009, 2 pgs.
U.S. Appl. No. 11/081,324, Examiner's Amendment Communication mailed Sep. 11, 2009, 2 pgs.
U.S. Appl. No. 11/081,324, Petition dated Oct. 5, 2009, 1 page.
U.S. Appl. No. 12/035,878, Amendment and Response filed Jan. 28, 2011, 14 pgs.
U.S. Appl. No. 12/035,878, Amendment and Response filed Nov. 28, 2011, 15 pgs.
U.S. Appl. No. 12/035,878, Amendment and Response filed Jul. 14, 2011, 14 pgs.
U.S. Appl. No. 12/035,878, Final Office Action mailed Apr. 14, 2011, 28 pgs.
U.S. Appl. No. 12/035,878, Office Action mailed Jan. 27, 2012, 27 pgs.
U.S. Appl. No. 12/035,878, Office Action mailed Oct. 28, 2010, 30 pgs.
U.S. Appl. No. 12/035,878, Office Action mailed Aug. 26, 2011, 27 pgs.
U.S. Appl. No. 10/955,271, Office Action dated Apr. 17, 2007, 16 pgs.
U.S. Appl. No. 10/955,271, Amendment and Response filed Jan. 16, 2007, 12 pgs.
U.S. Appl. No. 10/955,271, Amendment and Response filed Dec. 4, 2006, 14 pgs.
U.S. Appl. No. 10/955,271, Amendment and Response filed Jul. 24, 2006, 13 pgs.
U.S. Appl. No. 10/955,271, Amendment and Response filed Jul. 31, 2007, 16 pgs.
U.S. Appl. No. 10/955,271, Notice of Allowance mailed Oct. 12, 2007, 7 pgs.
U.S. Appl. No. 10/955,271, Notice of Allowance mailed Dec. 14, 2007, 12 pgs.
U.S. Appl. No. 10/955,271, Office Action dated Apr. 20, 2006, 10 pgs.
U.S. Appl. No. 10/955,271, Office Action dated Oct. 3, 2006, 12 pgs.
U.S. Appl. No. 10/957,103, Office Action dated Feb. 18, 2010, 18 pgs.
U.S. Appl. No. 10/957,103, Office Action dated Jul. 21, 2009, 24 pgs.
U.S. Appl. No. 10/957,103, Final Office Action dated Aug. 31, 2010, 19 pages.
U.S. Appl. No. 10/957,103, Office Action dated Jan. 14, 2009, 22 pgs.
U.S. Appl. No. 10/957,103, Office Action dated Mar. 19, 2008, 20 pgs.
U.S. Appl. No. 10/957,103, Office Action dated May 16, 2007, 16 pgs.
U.S. Appl. No. 10/957,103, Office Action dated Oct. 23, 2007, 25 pgs.
U.S. Appl. No. 10/957,103, Office Action dated Sep. 12, 2008, 25 pgs.
U.S. Appl. No. 11/013,630, Amendment and Response filed Jan. 31, 2007, 13 pgs.
U.S. Appl. No. 11/013,630, Notice of Allowance mailed Mar. 16, 2007, 7 pgs.
U.S. Appl. No. 11/013,630, Notice of Allowance mailed Jul. 26, 2007, 4 pgs.
U.S. Appl. No. 11/013,630, Office Action dated Oct. 31, 2006, 10 pgs.
U.S. Appl. No. 11/013,655, Notice of Allowance mailed Jan. 17, 2012, 5 pgs.
U.S. Appl. No. 11/013,655, Notice of Allowance mailed Jan. 30, 2012, 2 pgs.
U.S. Appl. No. 11/013,655, Office Action dated Apr. 9, 2008, 18 pgs.
U.S. Appl. No. 11/013,655, Office Action dated Aug. 19, 2009, 20 pgs.
U.S. Appl. No. 11/013,655, Office Action dated Jan. 9, 2009, 16 pgs.
U.S. Appl. No. 11/013,655, Office Action dated May 25, 2010, 31 pgs.

(56) References Cited

OTHER PUBLICATIONS

U.S. Appl. No. 11/081,323, Advisory Action mailed Oct. 31, 2008, 3 pgs.
U.S. Appl. No. 11/081,323, Amendment and Response filed Oct. 29, 2007, 11 pgs.
U.S. Appl. No. 11/081,323, Amendment and Response filed Apr. 20, 2007, 14 pgs.
U.S. Appl. No. 11/081,323, Amendment and Response filed Apr. 23, 2008, 11 pgs.
U.S. Appl. No. 11/081,323, Amendment and Response filed May 18, 2009, 13 pgs.
U.S. Appl. No. 11/081,323, Amendment and Response filed Sep. 18, 2008, 13 pgs.
U.S. Appl. No. 11/081,323, Amendment and Response filed Sep. 6, 2007, 12 pgs.
U.S. Appl. No. 11/081,323, Notice of Allowance mailed Dec. 1, 2009, 4 pgs.
U.S. Appl. No. 11/081,323, Notice of Allowance mailed Dec. 16, 2009, 4 pgs.
U.S. Appl. No. 11/081,323, Notice of Allowance mailed Feb. 23, 2010, 4 pgs.
U.S. Appl. No. 11/081,323, Notice of Allowance mailed Aug. 13, 2009, 6 pgs.
U.S. Appl. No. 11/081,323, Notice of Allowance mailed Sep. 18, 2009, 2 pgs.
U.S. Appl. No. 11/081,323, Office Action date Jan. 23, 2008, 9 pgs.
U.S. Appl. No. 11/081,323, Office Action dated Feb. 18, 2009, 12 pgs.
U.S. Appl. No. 11/081,323, Office Action dated Jan. 22, 2007, 10 pgs.
U.S. Appl. No. 11/081,323, Office Action dated Jul. 18, 2008, 13 pgs.
U.S. Appl. No. 11/081,323, Office Action dated Jul. 6, 2007, 11 pgs.
U.S. Appl. No. 11/081,324, Advisory Action mailed Jan. 29, 2009, 3 pgs.
U.S. Appl. No. 11/081,324, Advisory Action mailed Feb. 29, 2008, 3 pgs.
U.S. Appl. No. 11/081,324, Amendment and Response mailed Jan. 26, 2009, 17 pgs.
U.S. Appl. No. 11/081,324, Amendment and Response mailed Feb. 11, 2008, 15 pgs.
U.S. Appl. No. 11/081,324, Amendment and Response mailed Sep. 12, 2008, 15 pgs.
U.S. Appl. No. 11/081,324, Amendment and Response mailed Sep. 28, 2007, 16 pgs.
U.S. Appl. No. 11/081,324, Notice of Allowance mailed Nov. 30, 2009, 6 pgs.
U.S. Appl. No. 11/081,324, Notice of Allowance mailed Mar. 5, 2010, 6 pgs.
U.S. Appl. No. 11/081,324, Notice of Allowance mailed Jun. 10, 2009, 12 pgs.
U.S. Appl. No. 11/081,324, Office Action dated Dec. 11, 2007, 15 pgs.
U.S. Appl. No. 11/081,324, Office Action dated Jun. 29, 2007, 16 pgs.
U.S. Appl. No. 11/081,324, Office Action dated May 12, 2008, 15 pgs.
U.S. Appl. No. 11/081,324, Office Action dated Nov. 26, 2008, 18 pgs.
U.S. Appl. No. 11/172,279, Advisory Action mailed Oct. 24, 2008, 3 pgs.
U.S. Appl. No. 11/172,279, Advisory Action mailed Aug. 23, 2007, 3 pgs.
U.S. Appl. No. 11/172,279, Amendment and Response mailed Jan. 11, 2010, 21 pgs.
U.S. Appl. No. 11/172,279, Amendment and Response mailed Oct. 16, 2008, 14 pgs.
U.S. Appl. No. 11/172,279, Amendment and Response mailed Nov. 19, 2007, 9 pgs.
U.S. Appl. No. 11/172,279, Amendment and Response mailed Feb. 18, 2009, 14 pgs.
U.S. Appl. No. 11/172,279, Amendment and Response mailed Feb. 27, 2007, 12 pgs.
U.S. Appl. No. 11/172,279, Amendment and Response mailed Jun. 6, 2008, 11 pgs.
U.S. Appl. No. 11/172,279, Amendment and Response mailed Jul. 28, 2009, 21 pgs.
U.S. Appl. No. 11/172,279, Amendment and Response mailed Aug. 17, 2007, 9 pgs.
U.S. Appl. No. 11/172,279, Final Office Action dated Aug. 19, 2008, 11 pgs.
U.S. Appl. No. 11/172,279, Final Office Action dated May 17, 2007, 13 pgs.
U.S. Appl. No. 11/172,279, Notice of Allowance mailed Apr. 2, 2010, 8 pgs.
U.S. Appl. No. 11/172,279, Office Action dated Apr. 29, 2009, 13 pgs.
U.S. Appl. No. 11/172,279, Office Action dated Mar. 6, 2008, 11 pgs.
U.S. Appl. No. 11/172,279, Office Action dated Nov. 12, 2009, 19 pgs.
U.S. Appl. No. 11/172,279, Office Action dated Nov. 27, 2006, 11 pgs.
V.I. Arnold et al., "Ergodic Problems of Classical Mechanics," W.A. Benjamin, Inc., pp. v-ix & pp. 1-51.
Visio 2003 Bible, Chapter 10 (pp. 187-202), Chapter 12 (pp. 223-238), Chapter 13 (pp. 239-252) and Chapter 14 (pp. 253-270), copyright 2004 by Wiley Publishing Company (cited in email communication from European Examiner on May 12, 20011 in European Application 05105366.8); 69 pgs.
Word Windows XP 2003, Microsoft Office 2003 Edition, no English translation, 10 pgs.
Y. Xu et al., "Chaos-Based Texture Synthesis," Visual Computing Group, Microsoft Research China, pp. 1-9.
yEd Graph Editor—Published Date: 2009; New yEd version 3.4.1, http://www.yworks.com/en/products_yed_about.html, 5 pgs.
Young, Michael J., "Microsoft Office System Inside Out"—2003 Edition, Michael Halvorson, 2003, p. 267.
Korean Notice of Preliminary Rejection dated Feb. 23, 2012 cited in Application No. 10-2006-0007338, 6 pgs.
U.S. Appl. No. 10/957,103, Office Action mailed Feb. 22, 2012, 19 pgs.
U.S. Appl. No. 12/723,127, Office Action mailed Feb. 27, 2012, 19 pgs.
Korean Notice of Preliminary Rejection in Application 10-2005-57172, mailed Jan. 25, 2012, 1 pg. English translation.
Korean Notice of Preliminary Rejection in Application 1020050073710, mailed Jan. 31, 2012, 1 pg. English translation.
Chinese 2nd Office Action in Application 201010587370.1, mailed Mar. 12, 2012, 8 pgs.
Korean Preliminary Rejection (English translation), Application 102006-0007338, mailed Feb. 23, 2012, 2 pgs.
U.S. Appl. No. 12/035,878, Amendment and Response filed Apr. 26, 2012, 14 pgs.
U.S. Appl. No. 11/351,341, Office Action mailed Mar. 20, 2008, 18 pgs.
U.S. Appl. No. 11/351,341, Amendment and Response filed Apr. 14, 2009, 18 pgs.
U.S. Appl. No. 11/351,341, Office Action mailed Aug. 7, 2009, 24 pgs.
U.S. Appl. No. 11/351,341, Amendment and Response filed Oct. 19, 2009, 14 pgs.
U.S. Appl. No. 11/351,341, Office Action mailed Jan. 7, 2010, 32 pgs.
U.S. Appl. No. 11/351,341, Amendment and Response filed Jul. 7, 2010, 17 pgs.
U.S. Appl. No. 11/351,341, Office Action mailed Sep. 2, 2010, 32 pgs.
U.S. Appl. No. 11/351,341, Amendment and Response filed Mar. 2, 2011, 11 pgs.
U.S. Appl. No. 11/351,341, Office Action mailed May 12, 2011, 25 pgs.

(56) References Cited

OTHER PUBLICATIONS

U.S. Appl. No. 11/351,341, Amendment and Response filed Sep. 12, 2011, 16 pgs.
U.S. Appl. No. 11/351,341, Office Action mailed Feb. 3, 2012, 34 pgs.
Jan Smith, "Jan's PowerPoint Advanced: Images", pp. 7 and 8. obtained online on Mar. 12, 2008 at: http://web.archive.org/web/200502082224 7/http://www.jegsworks.com/Lessons/presentations/advanced/images.htm, 9 pgs.
The University of Alberta, "PowerPoint Basics", pp. 1 and 7. obtained online on Mar. 6, 2008 at: http://web.archive.org/web/20050207083815/http://www.quasar. ualberta.ca/edpy202/tutorial/PowerPointIpptBasics/pptBasics.htm, 17 pgs.
Statistica, StatSoft User Interface, http://www.statsoft.com/uniquefeatureslinterface.html (Last Accessed: Nov. 30, 2005), 6 pgs.
Interactive information visualization. http://prefuse.sourceforge.net/ [Last Accessed: Nov. 30, 2005].
Intelligent User Interfaces: Components of Intelligent Interfaces. http://web.cs.wpLedu/Research/airglIntIntlintint-paper-components.html [Last Accessed: Nov. 30, 2005], 4 pgs.
Roth, et al. "SageTools: An Intelligent Environment for Sketching, Browsing, and Customizing Data-Graphics". School of Computer Science. Carnegie Mellon University. Proceedings CHI'95 Human Factors in Computing Systems, ACM, May 1995, 2 pgs.
Change Date and Time Formats dialog box, Microsoft Office Online. Copyright 2006 Microsoft Corporation. [Last Accessed: Apr. 7, 2006], 1 pg.
Advanced Timeline Options dialog box, Microsoft Office Online. Copyright 2006 Microsoft Corporation. [Last Accessed: Apr. 27, 2006], 1 pg.
Synchronize Interval dialog box, Microsoft Office Online. Copyright 2006 Microsoft Corporation. [Last Accessed: Apr. 27, 2006], 1 pg.
Configure Interval dialog box, Microsoft Office Online. Copyright 2006 Microsoft Corporation. [Last Accessed: Apr. 27, 2006], 1 pg.
Synchronize Milestone dialog box, Microsoft Office Online. Copyright 2006 Microsoft Corporation. [Last Accessed: Apr. 27, 2006], 1 pg.
Configure Milestone dialog box, Microsoft Office Online. Copyright 2006 Microsoft Corporation. [Last Accessed: Apr. 27, 2006], 1 pg.
Configure Timeline dialog box (Time Format tab), Microsoft Office Online. Copyright 2006 Microsoft Corporation. [Last Accessed: Apr. 27, 2006], 1 pg.
Configure Timeline dialog box (Time Period tab), Microsoft Office Online. Copyright 2006 Microsoft Corporation. [Last Accessed: Apr. 27, 2006] 1 pg.
About Microsoft Visual C++ 7.0 code to UML mapping, Microsoft Office Online. Copyright 2006 Microsoft Corporation. [Last Accessed: Apr. 27, 2006], 3 pgs.
Reverse engineered code in the Model Explorer tree view, Microsoft Office Online. Copyright 2006 Microsoft Corporation. [Last Accessed: Apr. 27, 2006], 2 pgs.
Example of a reverse-engineered solution: FM Stocks, Microsoft Office Online. Copyright 2006 Microsoft Corporation. [Last Accessed: Apr. 27, 2006], 1 pg.
Work with Visio UML model diagrams in Visual Studio .NET', Microsoft Office Online. Copyright 2006 Microsoft Corporation. [Last Accessed: Apr. 27, 2006), 1 pg.
About Microsoft Visual C# code to UML mapping, Microsoft Office Online. Copyright 2006 Microsoft Corporation. [Last Accessed: Apr. 27, 2006), 3 pgs.
About Microsoft Visual Basic .NET code to UML mapping, Microsoft Office Online. Copyright 2006 Microsoft Corporation. [Last Accessed: Apr. 27, 2006], 3 pgs.
Reverse engineer Visual Studio .NET source code, Microsoft Office Online. Copyright 2006 Microsoft Corporation. [Last Accessed: Apr. 27, 2006], 1 pg.
About reverse engineering code to the UML, Microsoft Office Online. Copyright 2006 Microsoft Corporation. [Last Accessed: Apr. 27, 2006], 1 pg.
Gantt Chart Options dialog box (Format tab), Microsoft Office Online. Copyright 2006 Microsoft Corporation. [Last Accessed: Apr. 27, 2006], 1 pg.
Gantt Chart Options dialog box (Date tab), Microsoft Office Online. Copyright 2006 Microsoft Corporation. [Last Accessed: Apr. 27, 2006], 1 pg.
About mapping fields from your data file to a Gantt chart, Microsoft Office Online. Copyright 2006 Microsoft Corporation. [Last Accessed: Apr. 27, 2006], 1 pg.
Insert Column dialog box, Microsoft Office Online. Copyright 2006 Microsoft Corporation. [Last Accessed: Apr. 27, 2006], 1 pg.
About selecting delimiters in a Gantt chart, Microsoft Office Online. Copyright 2006 Microsoft Corporation. [Last Accessed: Apr. 27, 2006], 1 pg.
Configure Working Time dialog box, Microsoft Office Online. Copyright 2006 Microsoft Corporation. [Last Accessed: Apr. 27, 2006], 1 pg.
Change Mapping dialog box, Microsoft Office Online. Copyright 2006 Microsoft Corporation. [Last Accessed: Apr. 27, 2006], 1 pg.
About breaking your organization chart across multiple pages, Microsoft Office Online. Copyright 2006 Microsoft Corporation. [Last Accessed: Apr. 27, 2006], 1 pg.
About choosing data file columns, Microsoft Office Online. Copyright 2006 Microsoft Corporation. [Last Accessed: Apr. 27, 2006], 1 pg.
About choosing actions and events for organization chart shapes, Microsoft Office Online. Copyright 2006 Microsoft Corporation. [Last Accessed: Apr. 27, 2006], 1 pg.
About ODBC data sources and organization charts, Microsoft Office Online. Copyright 2006 Microsoft Corporation. [Last Accessed: Apr. 27, 2006], 1 pg.
About defining a new ODBC data source, Microsoft Office Online. Copyright 2006 Microsoft Corporation. [Last Accessed: Apr. 27, 2006], 1 pg.
About assigning columns in data files to custom property fileds, Microsoft Office Online. Copyright 2006 Microsoft Corporation. [Last Accessed: Apr. 27, 2006], 1 pg.
About Organization Chart Wizard data, Microsoft Office Online. Copyright 2006 Microsoft Corporation. [Last Accessed: Apr. 27, 2006]1 pg.
About using Microsoft Query to retrieve external data, Microsoft Office Online. Copyright 2006 Microsoft Corporation. [Last Accessed: Apr. 27, 2006], 3 pgs.
About PivotTable reports, Microsoft Office Online. Copyright 2006 Microsoft Corporation. [Last Accessed: Apr. 27, 2006], 2 pgs.
PivotTable terminology demystified, Microsoft Office Online. Copyright 2006 Microsoft Corporation. [Last Accessed: Apr. 27, 2006], 4 pgs.
'Troubleshoot OLAP cubes, Microsoft Office Online. Copyright 2006 Microsoft Corporation. [Last Accessed: Apr. 27, 2006], 3 pgs.
Troubleshoot PivotChart reports, Microsoft Office Online. Copyright 2006 Microsoft Corporation. [Last Accessed: Apr. 27, 2006], 7 pgs.
Create a chart from data in a PivotTable report, Microsoft Office Online. Copyright 2006 Microsoft Corporation. [Last Accessed: Apr. 27, 2006], 1 pg.
Create a PivotChart report, Microsoft Office Online. Copyright 2006 Microsoft Corporation. [Last Accessed: Apr. 27, 2006], 3 pgs.
About charts, Microsoft Office Online. Copyright 2006 Microsoft Corporation. [Last Accessed: Apr. 27, 2006], 3 pgs.
About OLAP source data in PivotTable and PivotChart reports, Microsoft Office Online. Copyright 2006 Microsoft Corporation. [Last Accessed: Apr. 27, 2006], 3 pgs.
Overview of security and protection in Excel, Microsoft Office Online. Copyright 2006 Microsoft Corporation. [Last Accessed: Apr. 27, 2006], 4 pgs.
Keyboard shortcuts, Microsoft Office Online. Copyright 2006 Microsoft Corporation. [Last Accessed: Apr. 27, 2006], 17 pgs.

(56) References Cited

OTHER PUBLICATIONS

'Troubleshoot PivotTable reports, Microsoft Office Online. Copyright 2006 Microsoft Corporation. [Last Accessed: Apr. 27, 2006], 7 pgs.
Troubleshoot charts, Microsoft Office Online. Copyright 2006 Microsoft Corporation. [Last Accessed: Apr. 27, 2006], 11 pgs.
About importing data, Microsoft Office Online. Copyright 2006 Microsoft Corporation. [Last Accessed: Apr. 27, 2006], 3 pgs.
Create a PivotTable report, Microsoft Office Online. Copyright 2006 Microsoft Corporation. [Last Accessed: Apr. 27, 2006], 2 pgs.
Create a chart, Microsoft Office Online. Copyright 2006 Microsoft Corporation. [Last Accessed: Apr. 27, 2006], 2 pgs.
About combination charts, Microsoft Office Online. Copyright 2006 Microsoft Corporation. [Last Accessed: Apr. 27, 2006], 1 pg.
About PivotTable and PivotChart source data, Microsoft Office Online. Copyright 2006 Microsoft Corporation. [Last Accessed: Apr. 27, 2006], 3 pgs.
Using Excel 2003 with earlier versions of Excel, Microsoft Office Online. Copyright 2006 Microsoft Corporation. [Last Accessed: Apr. 27, 2006], 4 pgs.
Add, link, edit, or remove titles in a chart, Microsoft Office Online. Copyright 2006 Microsoft Corporation. [Last Accessed: Apr. 27, 2006], 2 pgs.
Show or hide a chart legend or data table, Microsoft Office Online. Copyright 2006 Microsoft Corporation. [Last Accessed: Apr. 27, 2006], 2 pgs.
Where is the Chart menu?, Microsoft Office Online. Copyright 2006 Microsoft Corporation. [Last Accessed: Apr. 27, 2006], 1 pg.
Chart Wizard, Microsoft Office Online. Copyright 2006 Microsoft Corporation. [Last Accessed: Apr. 27, 2006], 4 pgs.
PivotTable and PivotChart Wizard, Microsoft Office Online. Copyright 2006 Microsoft Corporation. [Last Accessed: Apr. 27, 2006], 3 pgs.
Outline a list of data in a worksheet, Microsoft Office Online. Copyright 2006 Microsoft Corporation. [Last Accessed: Apr. 27, 2006], 14 pgs.
Available chart types, Microsoft Office Online. Copyright 2006 Microsoft Corporation. [Last Accessed: Apr. 27, 2006], 7 pgs.
Create a Gantt chart in Excel, Microsoft Office Online. Copyright 2006 Microsoft Corporation. [Last Accessed: Apr. 27, 2006], 2 pgs.
Creating a Bubble chart, Microsoft Office Online. Copyright 2006 Microsoft Corporation. [Last Accessed: Apr. 27, 2006,] 2 pgs.
Creating a Stock chart, Microsoft Office Online. Copyright 2006 Microsoft Corporation. [Last Accessed: Apr. 27, 2006], 2 pgs.
Creating a Surface chart, Microsoft Office Online. Copyright 2006 Microsoft Corporation. [Last Accessed: Apr. 27, 2006], 3 pgs.
Creating Pie of Pie and Bar of Pie charts, Microsoft Office Online. Copyright 2006 Microsoft Corporation. [Last Accessed: Apr. 27, 2006], 3 pgs.
Export a SharePoint list to a spreadsheet, Microsoft Office Online. Copyright 2006 Microsoft Corporation. [Last Accessed: Apr. 27, 2006], 2 pgs.
PivotTable reports 101, Microsoft Office Online. Copyright 2006 Microsoft Corporation. [Last Accessed: Apr. 27, 2006], 11 pgs.
'Top tips for Excel: Charts and graphics, Microsoft Office Online. Copyright 2006 Microsoft Corporation. [Last Accessed: Apr. 27, 2006], 2 pgs.
Using charts and diagrams in the classroom, Microsoft Office Online. Copyright 2006 Microsoft Corporation. [Last Accessed: Apr. 27, 2006], 5 pgs.
Five ways to subtotal values in repeating data, Microsoft Office Online. Copyright 2006 Microsoft Corporation. [Last Accessed: Apr. 27, 2006], 5 pgs.
Modeling exponential growth, Microsoft Office Online. Copyright 2006 Microsoft Corporation. [Last Accessed: Apr. 27, 2006], 2 pgs.
Korean Notice of Final Rejection in Application 10-2005-00738480, mailed Apr. 30, 2012, 6 pgs.
U.S. Appl. No. 12/035,878, Office Action mailed May 15, 2012, 37 pgs.
U.S. Appl. No. 13/362,879, Notice of Allowance mailed May 14, 2012, 5 pgs.
U.S. Appl. No. 10/957,103, Amendment and Response filed Jun. 22, 2012, 28 pgs.
U.S. Appl. No. 12/723,127, Amendment and Response filed Jun. 26, 2012, 17 pgs.
U.S. Appl. No. 11/351,341, Amendment and Response filed Jul. 2, 2012, 21 pgs.
European Oral Summons in EP Application 06111105.0, mailed May 15, 2012, 10 pgs.
Japanese Notice of Rejection in Application 2011-245199, mailed Apr. 16, 2012, 3 pgs.
U.S. Appl. No. 12/723,127, Office Action mailed Aug. 6, 2012, 23 pgs.
U.S. Appl. No. 12/035,878, Amendment and Response filed Aug. 21, 2012, 15 pgs.
Korean Final Notice of Rejection in Application 10-2005-0057172, mailed Aug. 29, 2012, 2 pgs.
Chinese Final Rejection in Application 201010587370.1, mailed Sep. 5, 2012, 6 pgs.
Canadian Office Action in Application 2517409, mailed Sep. 19, 2012, 6 pgs.
Taiwan Notice of Allowance in Application 94127756, mailed Aug. 23, 2012, 4 pgs.
European Brief Communication in Application 06111105.0, mailed Sep. 17, 2012, 10 pgs.
Japanese Final Notice of Rejection in Application 2011-245199, mailed Sep. 7, 2012, 4 pgs.
U.S. Appl. No. 10/957,103, Notice of Allowance mailed Oct. 5, 2012, 5 pgs.
European Decision to Refuse in EP Application 06111105.0, mailed Oct. 5, 2012, 27 pgs.
European Minutes of the Sep. 27, 2012 Oral Proceedings in EP Application 06111105.0, mailed Oct. 5, 2012, 3 pgs.
Canadian Notice of Allowance in Application 2517409, mailed Aug. 29, 2013, 1 page.
U.S. Appl. No. 12/035,878, Office Action mailed Nov. 8, 2013, 35 pgs.
U.S. Appl. No. 12/723,127, Amendment and Response filed Nov. 6, 2012, 14 pgs.
U.S. Appl. No. 11/351,341, Notice of Allowance mailed Oct. 22, 2012, 21 pgs.
Microsoft Office Word 2003 11.6568.6568 with Service Pack 2, Part of Microsoft Office Professional Edition 2003, 7 pgs.
Microsoft Office PowerPoint 2003 11.6564.6568 with Service Pack 2, Part of Microsoft Office Professional Edition 2003, 9 pgs.
Japanese Notice of Allowance in Application 2011-160788, mailed Aug. 21, 2012, 4 pgs.
U.S. Appl. No. 12/723,127, Notice of Allowance mailed Dec. 17, 2013, 11 pgs.
U.S. Appl. No. 12/035,878, Amendment and Response filed Feb. 10, 2014, 15 pgs.
U.S. Appl. No. 12/035,878, Notice of Allowance mailed Mar. 14, 2014, 10 pgs.
U.S. Appl. No. 12/723,127, Notice of Allowance mailed Feb. 28, 2014, 8 pgs.
Chinese Notice of Allowance in Application 201010587370.1, mailed Feb. 13, 2014, 4 pgs.
Russian Notice of Allowance in Application 2010100807, received Jan. 31, 2014, 6 pgs.
U.S. Appl. No. 13/855,386, Amendment and Response filed Oct. 14, 2015, 12 pgs.
"Show Me Microsoft Office Powerpoint 2003" by Steve Johnson, Perspection, Inc., Publisher: Que, Publication Date: Oct. 2, 2003, Print ISBN-10; 0-7897-3009-X, 530 pgs.
U.S. Appl. No. 14/296,023, Office Action mailed Dec. 10, 2015, 13 pgs.
U.S. Appl. No. 13/933,390, Office Action mailed Feb. 2, 2016, 13 pgs.
U.S. Appl. No. 14/296,023, Amendment and Response filed Mar. 10, 2016, 14 pgs.
U.S. Appl. No. 13/855,386, Office Action mailed Mar. 21, 2016, 12 pgs.

(56) References Cited

OTHER PUBLICATIONS

U.S. Appl. No. 13/933,390, Amendment and Response filed May 2, 2016, 20 pgs.
U.S. Appl. No. 13/933,390, Notice of Allowance mailed Jun. 21, 2016, 7 pgs.
U.S. Appl. No. 14/296,023, Notice of Allowance mailed Jun. 22, 2016, 8 pgs.
U.S. Appl. No. 13/855,386, Amendment and Response filed Jun. 21, 2016, 12 pgs.
U.S. Appl. No. 14/296,023, Amendment and Response filed Aug. 29, 2016, 9 pgs.
U.S. Appl. No. 13/855,386, Notice of Allowance mailed Aug. 12, 2016, 11 pgs.
Wenwen, D. et al., "Hierarchical Topics: Visually Exploring Large Text Collections Using Topic Hierarchies", Dec. 2013, IEEE, vol. 19, No. 12, pp. 2002-2011.
Mighlani, D. et al., "Intelligent Hierarchical Layout Segmentation of Document Images on the Basis of Colour Content", Dec. 1997, IEEE Tencon, pp. 191-194.

MAINTAINING GRAPHICAL PRESENTATIONS BASED ON USER CUSTOMIZATIONS

RELATED APPLICATIONS

This application is a continuation application of U.S. patent application Ser. No. 13/362,879 (now U.S. Pat. No. 8,269,790), entitled "Maintaining Graphical Presentations Based On User Customizations," filed on Jan. 31, 2012, which is a continuation application of U.S. patent application Ser. No. 11/013,655, (now U.S. Pat. No. 8,134,575), entitled "Maintaining Graphical Presentations Based On User Customizations," filed on Dec. 15, 2004, which is a continuation-in-part of U.S. patent application Ser. No. 10/957,103 (now U.S. Pat. No. 8,510,657), entitled "Editing The Text Of An Arbitrary Graphic Via A Hierarchical List," filed on Sep. 30, 2004, the complete disclosures of which are hereby incorporated by reference in their entirety.

TECHNICAL FIELD

The present invention relates generally to the creation and editing of visual presentations, and more particularly, to displaying graphics based on user customizations.

BACKGROUND OF THE INVENTION

Visual aids help people understand information. Conveying information to or among groups of people almost necessarily requires creating visual presentations embodying the information. Graphics application programs, such as the Microsoft® PowerPoint® presentation application, have helped automate the task of creating such visual presentations. Such graphics application programs allow users to convey information more efficiently and effectively by putting that information in an easily understandable format referred to herein as a graphic.

A graphic is a visual representation, such as a diagram or other drawing, of an idea. A graphic is typically composed of several graphical elements that represent content embodying the idea, such as, for example, a bulleted list. Each graphical element is a part of the displayed graphic. A graphical element can have both textual and graphical characteristics. Whereas graphical characteristics generally refer to pictorial or other visual features of a graphical element, textual characteristics generally refer to the written matter within the graphical element. Depending on the information and the audience, a user of a graphics application program generally determines a specific graphic that will best teach or convey the underlying information. Generally, conventional graphics application programs provide one of two approaches for creating a graphic.

On one hand, some conventional graphics application programs utilize a manual drawing approach in which users have full flexibility in creating and editing the graphic. As such, a user may position and customize the look of the graphical elements in the graphic as he or she sees fit. By providing such "free reigns" on graphic editing, however, this manual approach results in the user having to re-position and re-align those graphical elements in the graphic affected by the customization and/or repositioning of other graphical elements in the graphic. As one may guess, this approach generally requires a great deal of time to manipulate the graphic to render a final product. The user's time is inefficiently spent manipulating the visual aspects of the graphic rather than focusing on the message that is to be portrayed in the graphic. Moreover, this approach requires, at least to some extent, graphical design abilities. Those users that do not have strong design skills are even further limited by the manual approach.

On the other hand, some conventional graphics application programs utilize an automatic drawing approach in which the layout and look for each graphic is automatically defined based on the type of graphic desired by a user and the graphical elements predetermined for the graphic. In this approach, the burden of aligning and positioning graphical elements in the graphic is taken away from the user and placed instead with the application program. However, this approach is problematic in the sense that the user is typically only provided a limited fixed set of graphic definitions to choose from. Additionally, the user is not empowered to customize the graphic based on his or her desires without first abandoning altogether the automatic drawing functionality, thereby defeating the purpose for using this approach in the first place.

It is with respect to these and other considerations that the present invention has been made.

SUMMARY OF THE INVENTION

In accordance with the present invention, a computer-implemented method is provided for rendering a graphic on a display screen. The graphic is a visual representation of content in which items may or may not be arranged in a predetermined structure. Various forms of content may be represented using the graphic, but for illustration purposes, the content is described herein as textual content. In receipt of the content, the method involves receiving selection of a graphic definition that is to visually represent the content. The selected graphic definition specifies default properties for the appearance and layout of graphical elements for graphics created under the graphic definition. Next, the method creates the graphic to include graphical elements corresponding to the items in the content and according to a customization of at least one of the default properties previously applied to a graphic rendered for the content based on a different graphic definition. The created graphic is then output to a display module for display to a user.

In accordance with embodiments of the invention, the customization is identified by analyzing a set of properties persistent across all possible graphic definitions, wherein this set of properties is specified in a "semantic" model. Thus, the semantic model defines those properties that are applicable to graphics corresponding to all possible graphic definitions. In accordance with yet another embodiment, creation of the graphic may also take into account customizations that are specific to the particular graphic definition for the graphic currently being rendered. These customizations are maintained in a "presentation" model that is retrieved along with the semantic model in response to selection of the associated graphic definition.

In yet further embodiments, the present invention provides a system for visually representing content. The system includes a plurality of possible graphic definitions each specifying default properties for an associated graphic operable to represent the content. The system also includes a semantic model that defines "semantic" properties for all possible graphic definitions such that each associated graphic represents a similar item in the content using a similar semantic property. Additionally, the system according to this embodiment includes a customization engine operable to define graphics according to different graphic definitions and the semantic model.

In accordance with yet another embodiment, the system includes a plurality of presentation models. One or more of the presentation models are associated with one or more of the plurality of possible graphic definitions. Each of the presentation models define presentation properties specific to the graphic definition to which each of the one or more presentation models is associated. In response to selection of a specific graphic definition for display, the customization engine renders a graphic according to the selected definition, the semantic model, which is persistent across all graphic definitions, and one or more presentation models associated with the selected definition. Thus, the graphic is displayed based on the selected definition, but has appearance and layout properties customized as dictated in the associated presentation model(s) and the semantic model.

In accordance with still another embodiment, the present invention is directed to a method for customizing a graphic having graphical elements displayed on a display screen. In response to receiving a request to modify the graphic, the method involves modifying the graphic based on the request while maintaining a customization previously applied to the graphic. Specifically, the customization relates to a property of a first graphical element in the graphic relative to a second graphical element in the graphic. For example, the customization may relate to the positioning or size of the first graphical element relative to the second graphical element. In an embodiment, the modification request embodies an instruction to add a graphical element to the graphic.

The various embodiments of the present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The present invention will now be described more fully hereinafter with reference to the accompanying drawings, in which embodiments of the invention are shown. This invention may, however, be embodied in many, different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In general, the present invention relates to customizing the visual representation of content displayed in one or more graphics. The content may be any form of information, but is described herein as textual data in accordance with an exemplary embodiment of the present invention. The content may be provided by a user (e.g., by keyboard, mouse, etc.), an application program, or a combination of both. Each graphic includes at least one graphical element, which may have textual characteristics, graphical characteristics or both.

In accordance with an embodiment, the present invention provides a computer-implemented method for displaying (referred to herein as, "display process") a graphic based on user customizations to appearance and layout properties of one or more graphical elements in the graphic. Such properties include color, positioning, size, shape, formatting and other visual attributes associated with the graphical elements.

The display process is embodied in a computer graphics application having a user interface (UI) for creating and editing graphics. The computer graphics application may be either a stand-alone computer application or a sub-component of another computer application, such as, without limitation, a presentation application, a word processing application, a drawing application or a spreadsheet application. Those skilled in the art will appreciate the applicability of the computer graphics application to these other forms of computer applications, which are typically collected in an office suite of applications, such as Microsoft Office® and OpenOffice.

The present invention is described in the general context of computer-executable instructions (e.g., program modules) executed by one or more computers or other devices. The functionality of the program modules may be combined or distributed as desired in various embodiments. The program modules include one or more routines, programs, objects, components, data structures, etc., that perform particular tasks or implement particular abstract data types.

Figure 1:
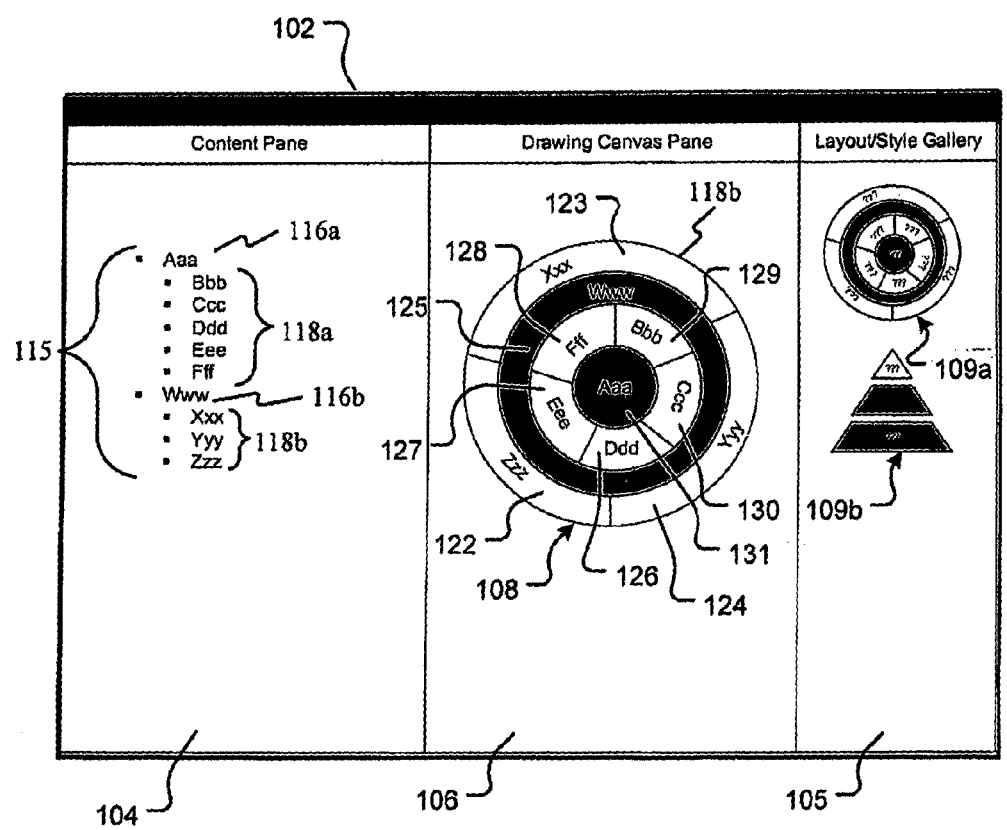
FIG. 1 illustrates a user interface of a computer graphics application for creating and editing graphics in accordance with an embodiment of the present invention.

Referring now to FIG. 1, an exemplary UI 102 for use in creating and editing graphics in a computer graphics application is shown in accordance with an embodiment of the present invention. The UI 102 is divided into a plurality of regions, or "panes," each responsible for various aspects of functionality of the computer graphics application. In an embodiment, the plurality of panes includes a content pane 104, a graphics pane 106 and a gallery pane 105.

The graphics pane 106 displays graphical content 108 created by the computer graphics application using content from the content pane 104. The graphical content 108 may be any form of a visual presentation, such as a drawing, diagram, etc., and is referred to herein as a "graphic" for nomenclature purposes. The gallery pane 105 provides the user with a plurality of selectable graphic definitions (e.g., 109a, 109b) that may be applied to the content in the content pane 104 and rendered in the graphics pane 106 as a graphic 108. Each of these three panes (104, 105 and 106) is now described in turn in greater detail relative to operation of the computer graphics application in accordance with various embodiments of the present invention.

The graphics pane 106, which is also referred to in FIG. 1 as a "drawing canvas pane," is a window, a windowpane, a graphics view class, or other display area that allows a user to visualize and edit graphical content rendered through the UI 102 by the computer graphics application. As such, the graphics pane 106 contains the graphic 108 rendered by the computer graphics application and provides a user of the application with the functionality to edit, or customize, the graphic 108 to his or her liking. The graphic 108 includes one or more graphical elements, such as graphical elements 122-131, that represent content entered into the content pane 104. Customization of the graphic 108 refers to the editing of any type of property associated with the graphic, including, without limitation, the visual attributes and positions of the graphical elements 122-131 as well as any text within these elements.

The graphic 108 is shown in FIG. 1 as a wheel diagram graphic for illustrative purposes. It should be appreciated that any type of graphic having any number of graphical elements, e.g., 122-131, is contemplated within the scope of the present invention. To this end, the graphical elements 122-131 may include, but are not limited to, nodes, transitions, callouts, or clipart. A node can be one of the shapes within the graphical content. Examples of nodes may include circles, squares, triangles, or parts of shapes, like segments. One skilled in the art will recognize different types of nodes. A transition is a graphical representation of an interrelation between nodes. The transition typically is a line, arrow, or other shape connoting a relationship between two nodes.

The content pane 104 is a window, a windowpane, outline view class, or other display area that allows a user to input a body of content 115 (hereinafter referred to as "content") into the UI 102 of the computer graphics application. As such, the content pane 104 is operable to accept content 115 for use by the computer graphics application in creating the graphic 108. Basically, the content 115 is an idea that the user intends the rendered graphic 108 to convey. In an embodiment, the content 115 includes textual data, which may or may not be arranged based on specific formatting properties, or a "predetermined structure." FIG. 1 illustrates the content 115 being textual data arranged based on specific formatting properties in accordance with this embodiment, wherein this textual data 115 represents a hierarchical list of ideas having interrelationships. In other embodiments, the content 115 can include information that is not textual, such as any other form of data including, but not limited to, clip art, pictures, videos, sounds, or other audio-visual materials.

In an embodiment, the content pane 104 is operable to receive input from a user and display that input as the content 115 for editing by the user. In this regard, the content 115 may be either manually entered (e.g., by keyboard) into the content pane 104 by a user or pasted from another area in the computer graphics application or another application program altogether. In accordance with another embodiment, the content 115 in the content pane 104 may be linked to another application or program, such that as the content data in the other program is created or modified, the content 115 within the content pane 104 will automatically appear or be modified. In still other embodiments, the user may manually refresh the linked data, such that the user forces the content data to update in the content pane 104 rather than having the graphics application or other program update automatically. In still other embodiments, the user may request and receive content data from another program, like a database. Alternatively, the content 115 may be input into the content pane 104 automatically (i.e., without user interaction) by the computer graphics application or by another application.

The gallery pane 105 is a window or other graphical user interface component operable to present various types of graphics definitions, such as the graphic definitions 109a and 109b shown for illustrative purposes. The graphic definitions 109a and 109b may be chosen by a user for application to the content 115 in the content pane 104 to render the graphic 108. In an embodiment, the gallery pane 105 allows a user to switch between the different graphic definitions 109a and 109b and apply the same content to the chosen graphic definition, e.g., 109a and 109b, without needing to recreate each graphic 108 from scratch.

Each graphic definition, e.g., 109a and 109b, is associated with a default set of properties for the graphic 108. In an embodiment, these properties relate to any visual or non-visual characteristic embodying the layout and appearance of graphical elements, e.g., 122-131, within the graphic 108. In response to a user selecting a specific graphic definition 109a or 109b, the computer graphics application uses the selected graphic definition 109a or 109b as the framework for the layout and appearance of the graphic 108. In accordance with an embodiment of the present invention, the computer graphics application dynamically renders the graphic 108 based on the properties defined in the selected definition 109a or 109b, as currently specified according to any customizations that have been applied to either (1) any of these properties that is persistent across all graphic definitions (e.g., 109a and 109b) or (2) any of these properties that are strictly applicable to the selected graphic definition 109a or 109b. Dynamic generation of the graphic 108 thus refers to the different properties that may be specified for the graphic 108 at different points in time at which a specific graphic definition, e.g., 109a and 109b, is selected by the user.

The gallery pane 105 shown in FIG. 1 is a simplified gallery of graphic definitions, e.g., 109a and 109b. Indeed, only two choices of graphic definitions, i.e., 109a and 109b, are shown in FIG. 1. However, the present invention is not limited to such a limited selection, but rather the gallery pane 105 may present the user with any number of graphic definitions, e.g., 109a and 109b, from which to choose. The first graphic definition 109a represents a wheel diagram. The second graphic definition 109b represents a pyramid diagram. In accordance with an embodiment, the first (109a) and second (109b) graphic definitions are represented in FIG. 1 as thumbnails. In other embodiments, the graphic definitions 109a and 109b may be represented on a menu or list of descriptive names that allow the user to choose a name from the list. One skilled in the art will recognize other ways of presenting the graphic definitions 109a and 109b within the gallery pane 105 are included in the present invention.

With the foregoing structures of the UI 102 in mind, operation of the computer graphics application is now described with reference to FIG. 1 in accordance with an embodiment of the present invention. The graphics pane 106 displays the rendered graphic 108 created from the content 115 in the content pane 104 and the selected graphic definition 109a or 109b, the properties specified by which may be customized as briefly described above. The graphic 108 includes graphic elements 122-131 representing the various items (e.g., 116a, 116b, 118a and 118b), or "entries," contained in the body of content 115. In the embodiment illustrated in FIG. 1, each graphical element 122-131 corresponds to a single item of the content 115. However, other embodiments involve a single graphical element, e.g., 122-131, representing multiple items of the content 115 and still other embodiments involve a single item of the content 115 being represented by multiple graphical elements, e.g., 122-131.

The content 115 may be input into the content pane 104 and a graphic definition 109a or 109b may be selected in any sequence without departing from the scope of the present invention. If a graphic definition 109a or 109b is selected by a user prior to any content 115 being entered into the content pane 104, a graphic 108 is displayed without any content or, alternatively, with a set of sample content. In contrast, a user may input data into the content pane 104 for entry as the content 115 prior to selecting a graphic definition 109a or 109b. In an embodiment in this case, the computer graphics application may provide the user with a default choice for the graphic definition 109a or 109b; thus, as the content 115 is entered, the graphics pane 106 may display a graphic 108 of the default graphic definition 109a or 109b that grows in graphical elements (e.g., 122-131) as the user continues to add the content 115. Alternatively, the graphics pane 106 may remain blank (i.e., without graphic 108) until the user selects a graphic definition 109a or 109b from the gallery pane 105.

FIG. 1 illustrates an exemplary embodiment of the present invention in which a user has entered content 115 in the form of textual content, and more precisely, in the form of a hierarchical list. In addition, the user has selected the wheel diagram graphic definition 109a. The graphics pane 106 displays the graphic 108, which is of the wheel diagram type 109a due to the user's selection. The wheel diagram graphic 108 represents the hierarchical list 115. Each of the graphical elements 122-131 in the graphic 108 corresponds to an item (i.e., line of text) in the hierarchical list 115. As noted above, however, other embodiments involve each of the graphical elements 122-131 corresponding to multiple items in the hierarchical list 115, and still other embodiments involve more than one of the graphical elements 122-131 corresponding to a single item in the hierarchical list 115.

In an embodiment, the structure of the textual content 115 in the content pane 104 determines the structure and appearance of the graphical elements 122-131 shown in the graphics pane 106. For example, a first layer of the wheel diagram graphic 108 is a parent element 131 corresponding to a first primary line 116a of textual content 115 in the content pane 104. A second layer of the wheel diagram graphic 108 includes elements 126, 127, 128, 129 and 130 that are subordinate to the parent element 131, and thus referred to as "child elements." The child elements 126, 127, 128, 129 and 130 correspond to the lines 118a of textual content 115 indented under the first line 116a. A third layer of the wheel diagram graphic 108 is also a parent element 125 and corresponds to a second primary line 116b of the textual content 115. Finally, a fourth layer of the wheel diagram graphic 108 includes child elements 122, 123 and 124 that are subordinate to the parent element 125. The child elements 122, 123 and 124 correspond to the lines 118b of the textual content 115 indented under the second primary line 116b. From the foregoing example, it should be appreciated that the textual content 115 in the content pane 104 is represented by various graphical elements 122-131 in the graphic 108 and the structure of the textual content 115 is represented by the structure of the graphical elements 122-131 in the graphic 108.

With the above example in mind, an embodiment of the present invention involves modifying the graphic 108 in response to changes within the textual content 115. For instance, if the indention of the top-most line of those lines 118a shown in FIG. 1 as being subordinate to the first primary line 116a is removed, a new layer would be created in the wheel diagram graphic 108 between the first layer and the second layer. This new layer would include the graphical element 129. The change would mean that the children graphical elements 126, 127, 128 and 130 would become children of the graphical element 129 because the top line of the lines 118a is now a "primary line" having children subordinate thereto.

Figure 2:
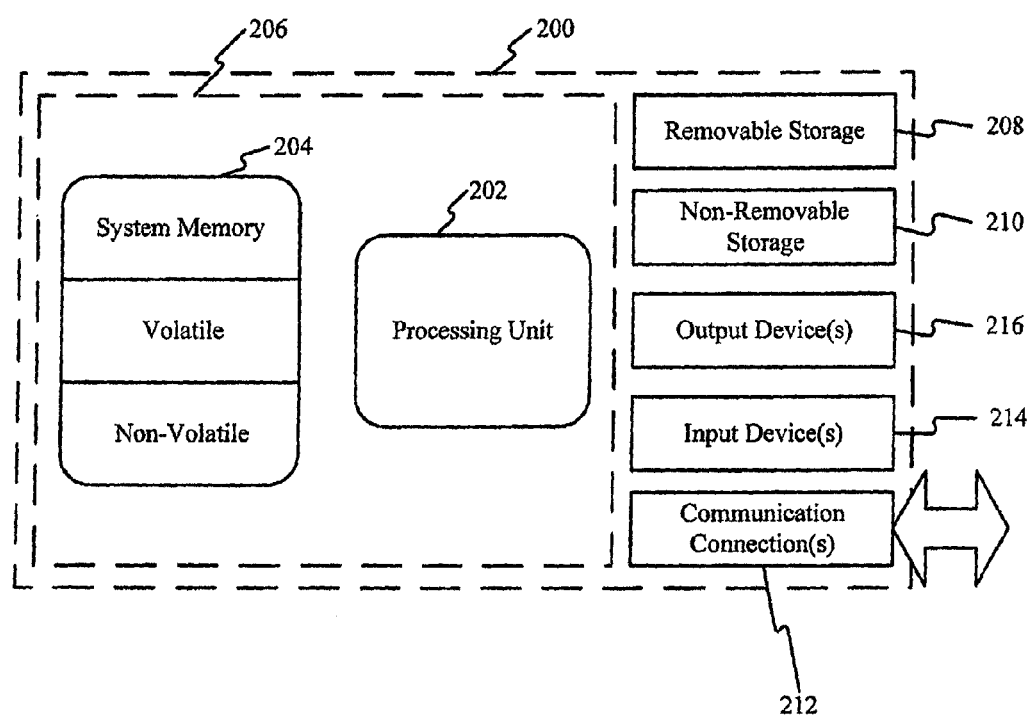
FIG. 2 shows an exemplary computer system upon which embodiments of the present invention may be implemented.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. The most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc, may also be included. The devices may help form the user interface 102 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of any of the above should also be included within the scope of computer readable media.

The computer device 200 may operate in a networked environment using logical connections to one or more remote computers (not shown). The remote computer may be a personal computer, a server computer system, a router, a network PC, a peer device or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Figure 3:
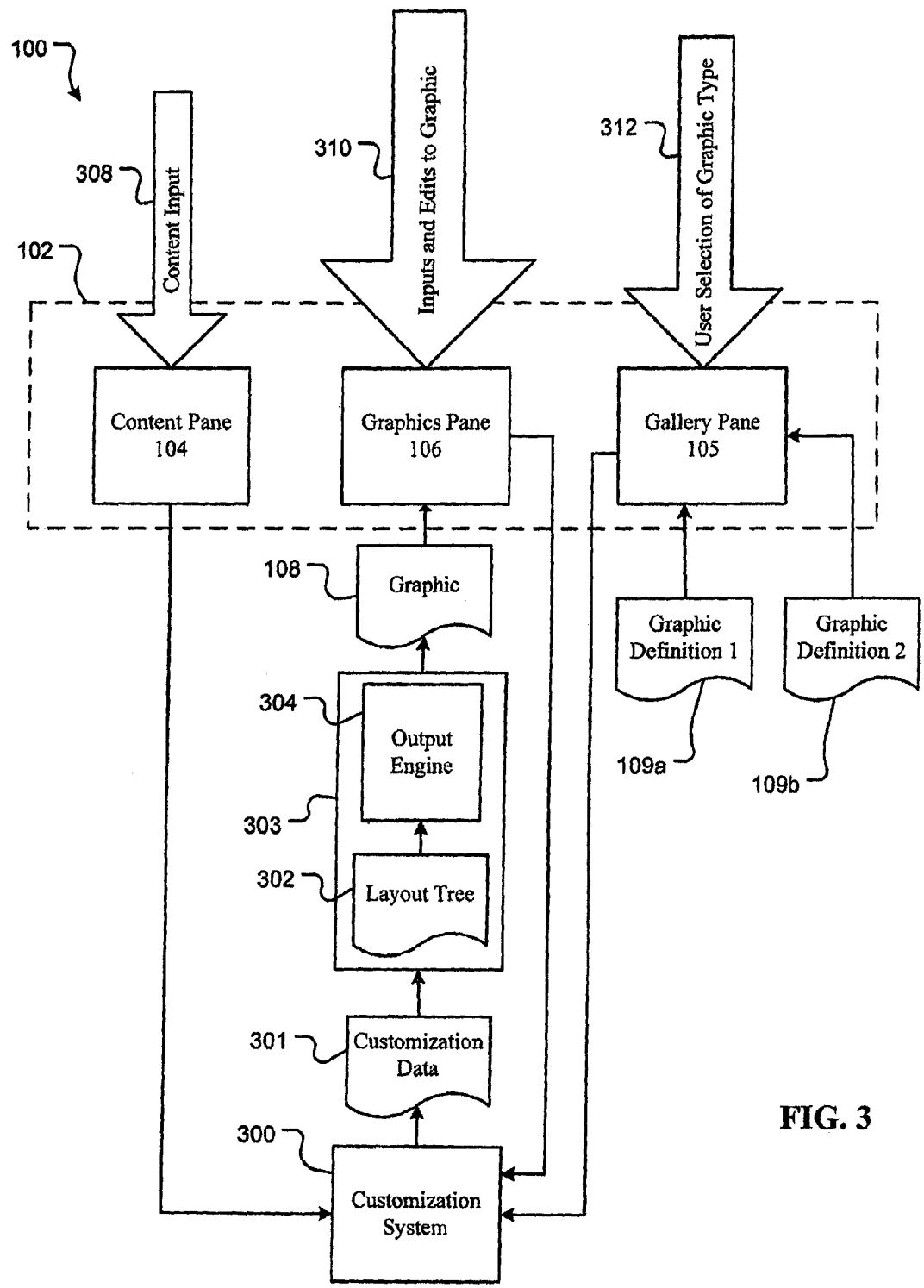
FIG. 3 is a functional diagram showing various components of a computer graphics application, including a customization system, in accordance with an embodiment of the present invention.

With the computing environment of FIG. 2 in mind, FIG. 3 illustrates a functional diagram embodying components of the computer graphics application 100 in accordance with an embodiment of the present invention. The computer graphics application 100 includes the user interface (UI) 102, which as noted in connection with FIG. 1 has a content pane 104, a graphics pane 106 and a gallery pane 105. Functional (block) arrows 308, 310 and 312 represent user interaction with the content pane 104, the graphics pane 106 and the gallery pane 105, respectively, in order to operate the computer graphics application 100.

More particularly, user interaction 308 with the content pane 104 results in the input of the content 115 into the computer graphics application 100. In response to such input, the computer graphics application 100 displays this content 115 within the content pane 104 for display and to enable editing by the user. Also, as described above, the computer graphics application 100 creates a graphic 108 representing this content 115 and displays this graphic 108 through the graphics pane 106. User interaction 310 with the graphics pane 106 results in editing of the graphic 108 displayed therein. As such, the user interaction 310 represents customizations to the graphic 108 displayed in the graphics pane 106. User interaction 312 with the gallery pane 105 results in the selection of a specific graphic pane definition from a plurality of graphic definitions, e.g., 109a and 109b, the graphical representations of which are displayed through the gallery pane 105 by icon, menu, toolbar, thumbnail or other known selectable UI component. Thus, selection of a specific graphic definition 109a or 109b through the gallery pane 105 yields the rendering of a graphic 108 in the graphics pane 106 based on the selected definition 109a or 109b.

In addition to the user interface components described above, the computer graphics application 100 also includes a customization system 300 and a layout engine 303. The customization system 300 and the layout engine 303 work together to provide the user interface 102 with the appropriate graphic 108 for rendering on the graphics pane 106. To accomplish this, the customization system 300 passes data 301 embodying the appearance and layout properties specified by the selected graphic definition 109a or 109b, and any associated customizations thereto, to the layout engine 303. For nomenclature purposes, this data 301 is hereinafter referred to as "customization data." The customization data 301 collectively defines the properties based on which the graphic 108 is to be rendered, as specified in the selected graphic definition 109a or 109b and according to any customizations that have been applied to either (1) any of these properties that are persistent across all graphic definitions (referred to below as "semantic" properties) or (2) any of these properties that are strictly applicable to the selected graphic definition 109a or 109b (referred to below as "presentation" properties). A more detailed illustration of the customization system 300 is provided below with reference to FIG. 4.

The layout engine 303 interprets the customization data 301 to generate a layout tree 302 for the graphic 108 being rendered. The layout tree 302 is then traversed to identify the appearance and layout properties for use in rendering the graphic 108. In an embodiment, traversal of the layout tree 302 is performed by a component of the layout engine 303 referred to as an "output engine" 304. In this embodiment, the output engine 304 renders the graphic 108 that is to be provided to the graphics pane 106 for display and editing. In receipt of the graphic 108, the graphics pane 106 displays the graphic 108 to the user for viewing and editing. The functionality and structure of the layout engine 303 is described in greater detail in accordance with an embodiment of the present invention in co-assigned U.S. patent application for "Method, System and Computer-Readable Medium for Creating and Laying Out a Graphic Within an Application Program," filed Sep. 30, 2004 and assigned Ser. No. 10/955,271, the entire disclosure of which is hereby incorporated by reference in its entirety. It should be appreciated that the graphic 108 may be constructed using the customization data 301 by means other than the layout engine 303, which is described above only for illustrative purposes in order to convey an exemplary embodiment of the present invention.

Figure 4:
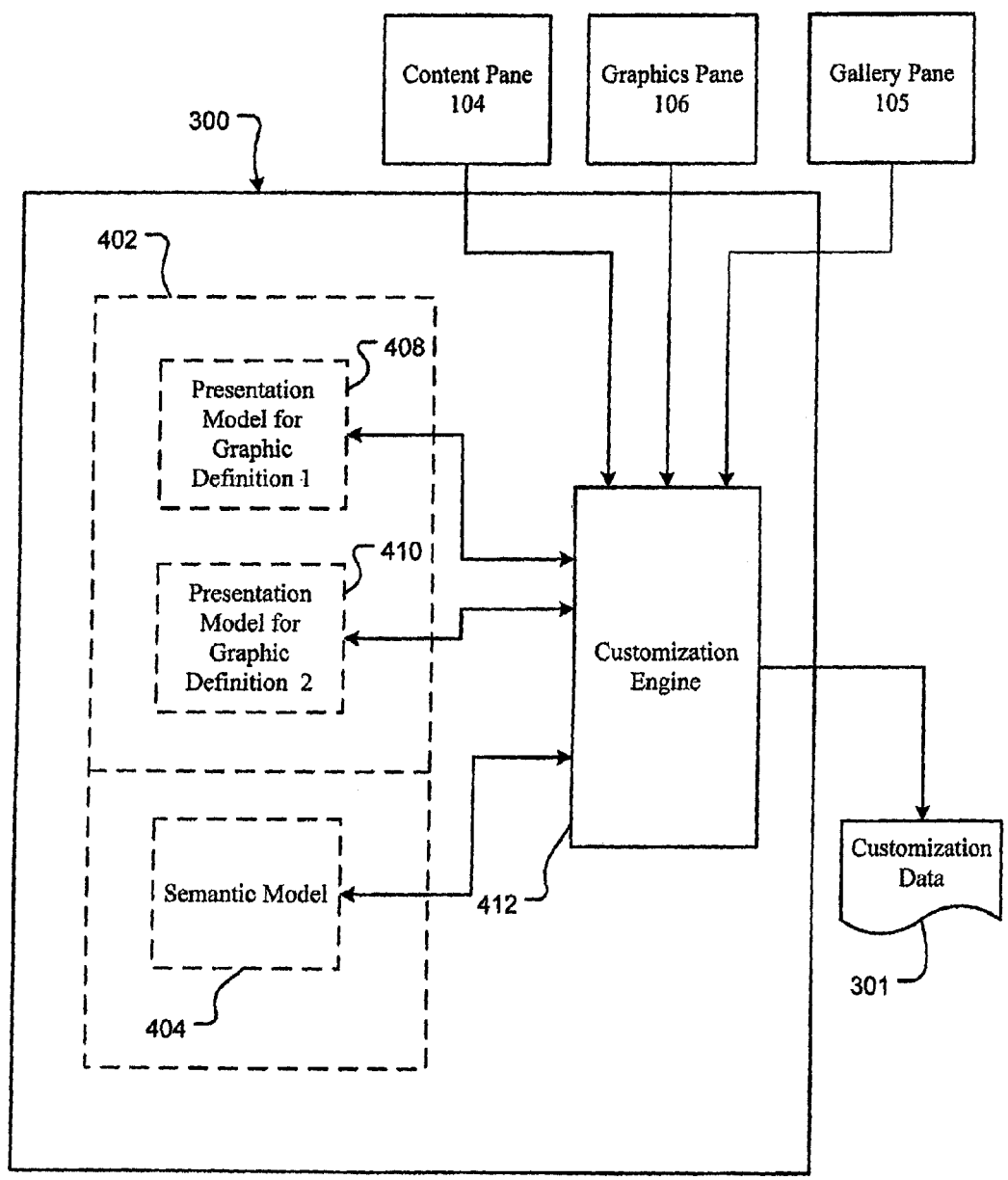
FIG. 4 is a functional diagram illustrating in more detail the customization system of FIG. 3 in accordance with an embodiment of the present invention.

Referring now to FIG. 4, the customization system 300 is shown in functional diagram format in accordance with an embodiment of the present invention. The customization system 300 includes a customization engine 412 and a graphical model library 402. The graphical model library 402 is a data structure that maintains a plurality of presentation models (e.g., 408 and 410) and a semantic model 404. The customization engine 412 uses the presentation models (e.g., 408 and 410) and the semantic model 404 to create customization data 301 for submission to the layout engine 303 for creation of graphics 108.

In an embodiment, the graphical model library 402 is specific to each instance and/or session of the computer graphics application 100. As such, the graphical model library 402 and its components are shown in dashed lines to illustrate instantiation of the library 402 and the models 408, 410 and 404 in memory for each instance of the computer graphics application 100. For example, if a user is creating and/or editing two different graphics 108 at the same time using the computer graphics application 100, a graphical model library 402 and associated models 408, 410 and 404 are created for each of the two different graphics 108. Alternatively, the graphical model library 402 and its components may be persisted across more than one instance and/or session of the computer graphics application 100. The implementation is a matter of choice, both of which are fully contemplated within the scope of the present invention.

The presentation models (e.g., 408 and 410) are data structures that maintain the current properties specific to each graphic definition 109a and 109b that may be selected through the gallery pane 105. Embodiments of the present invention are described illustratively with a 1:1 correlation of presentation models to graphic definitions 109a and 109b. As such, FIG. 1 shows the availability of two graphic definitions 109a and 109b that may be selected through the gallery pane 105, and thus, only two presentation models 408 and 410 are maintained in the graphical model library 402 shown in FIG. 4. It should be appreciated that the gallery pane 105 may be operable to select any number of graphic definitions 109a and 109b and the graphical model library 402 may include any number of presentation models (e.g., 408 and 410).

The semantic model 404 is a data structure that maintains current properties persisted across all graphic definitions 109a and 109b that may be selected by the user through the gallery pane 105. As such, there exists only one semantic model 404 within the graphical model library 402. Again, an embodiment of the present invention noted above involves maintaining a semantic model 404 with each instance and/or session of the computer graphics application 100, and therefore it is possible to have more than one semantic model 404.

In response to receiving a selection of a graphic definition 109a or 109b through the gallery pane 105, the customization engine 412 retrieves the appropriate presentation model 408 or 410 (i.e., the presentation model 408 associated with the selected graphic definition 306) and the semantic model 404. The customization engine 412 then creates the customization data 301 based on the current properties defined for the selected graphic definition 109a or 109b, as specified in the associated presentation model 408, and the semantic model 404.

The properties specified in the presentation models 408 and 410 and the semantic model 404 are dynamically updated based on input from the content pane 104 and the graphics pane 106. With respect to the content pane 104, as the user is adding content 115 through the user interaction 308, the presentation models 408 and 410 and the semantic model 404 are updated to reflect the addition of such content 115. For example, if a hierarchical list has textual content lines "A," "B" and "C," then each of the presentation models 408 and 410 and the semantic model 404 in the graphical model library 402 have in-memory representations for a graphical element corresponding to each of the textual content lines "A," "B" and "C." In response to a user adding a fourth textual content line "D," the customization engine 412 updates each of the presentation models 408 and 410 and the semantic model 404 to include an in-memory representation for a graphical element corresponding to this new textual content line. Therefore, the customization data 301 created by the customization engine 412 will include the addition of this new graphical element by virtue of the appropriate presentation model 408 or 410 and the semantic model 404 specifying same.

With respect to the graphics pane 106, as the user is editing a rendered graphic 108 through the user interaction 310, the customization engine 412 updates the presentation model (e.g., 408 or 410) corresponding to the graphic definition 306 associated with the edited graphic 108 or, alternatively, the semantic model 404 to reflect the user's customizations. In this regard, the customization engine 412 updates the appropriate presentation model (e.g., 408 or 410) if the customization is a change to a presentation property, i.e., a "presentation change." In contrast, the customization engine 412 updates the semantic model 404 if the customization is a change to a semantic property, i.e., a "semantic change."

Generally, categorization of a change to any property of a graphic 108 as being a "presentation" change or a "semantic" change is a matter of choice and any such categorizations are within the scope of the present invention. For illustration purposes only, an exemplary semantic change is herein described as being change to the color of a graphical element and an exemplary presentation change is herein described as being a change to the size of a graphical element. With these illustrations in mind, FIGS. 5A-5C illustrate operational features of the present invention relative to updating a presentation model 408 and a semantic model 404 in response to user interaction entered into the graphics pane 106.

Figure 5A:
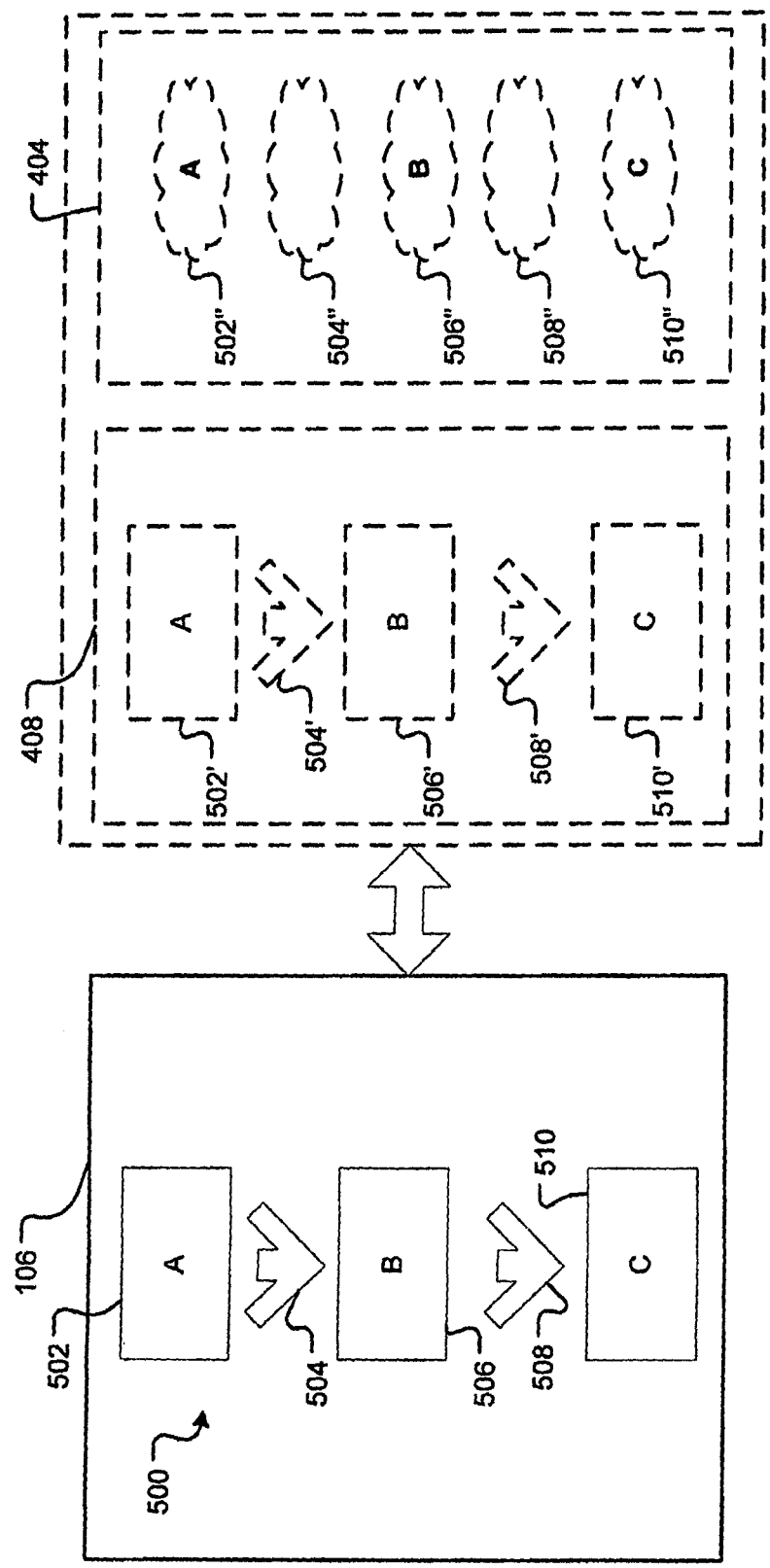
FIGS. 5A-5C illustrate in sequence operation of the customization system of FIG. 4 to manage customization of graphics being edited in the computer graphics application.
Figure 5B:
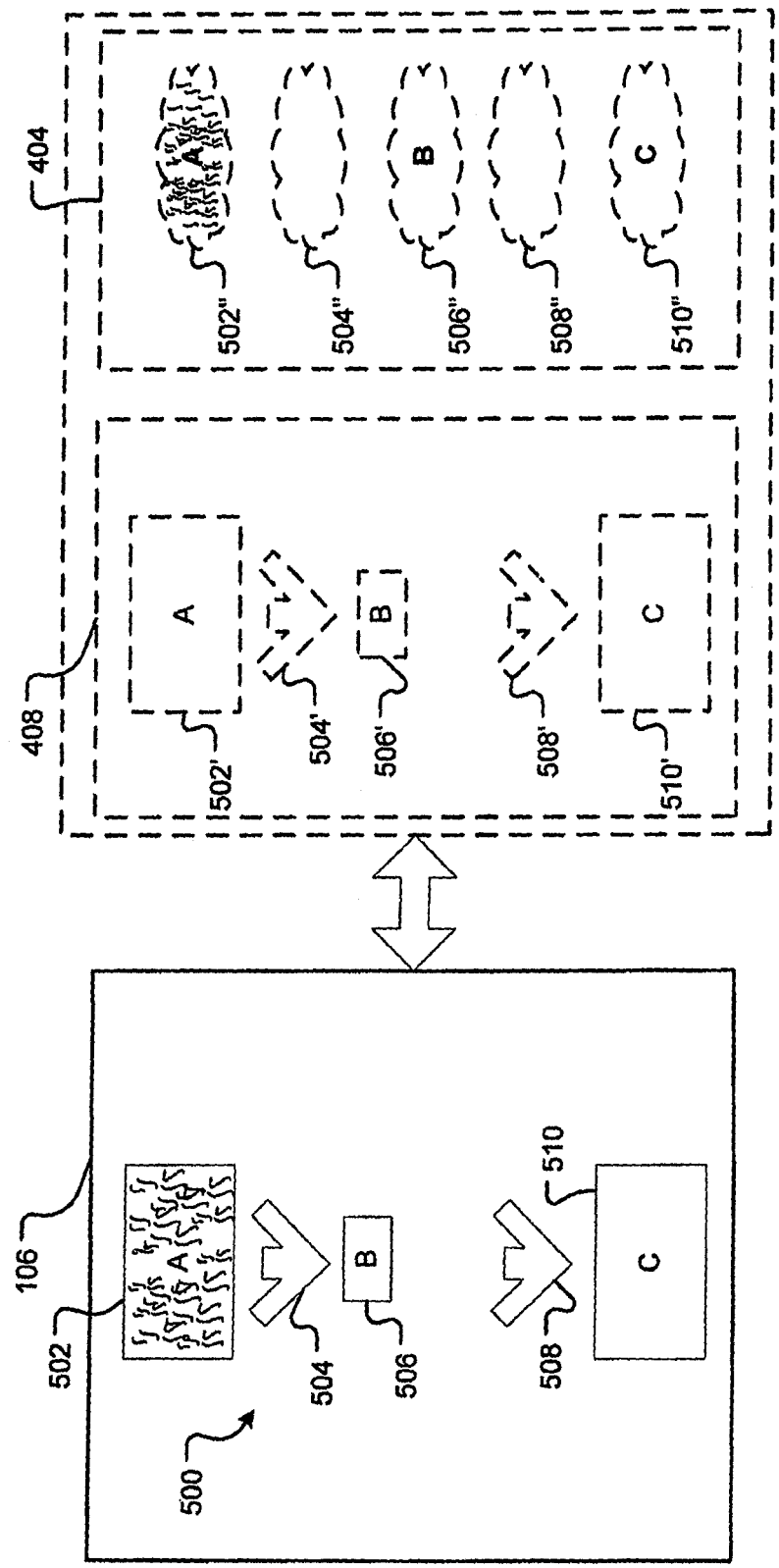
Figure 5C:
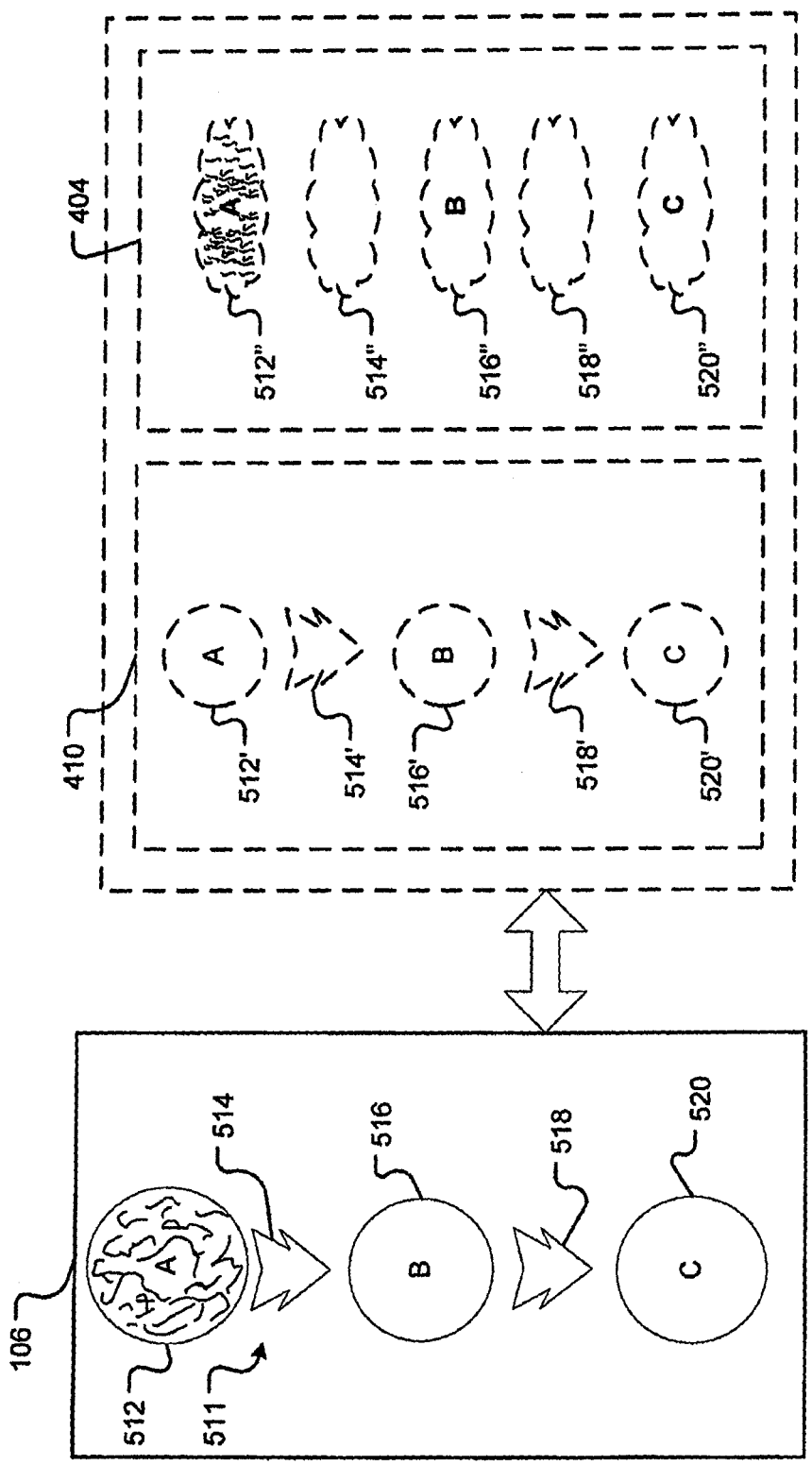

FIG. 5A illustrates a graphic 500 having graphical elements 502, 504, 506, 508 and 510 being displayed through the graphics pane 106. The graphical elements 502, 506 and 510 correspond to textual content lines, or entities, "A," "B," and "C," respectively, included in the content 115 of the content pane 104. The graphic 500 has not yet been edited by a user, and therefore has no customizations. As such, the graphic 500 is shown in the graphics pane 106 using default properties defined by the graphic definition 109a or 109b to which the graphic 500 belongs. The presentation model 408 and the semantic model 404 for the graphic 500 are shown with these default properties, which in effect, were used by the customization engine 412 to generate the customization data 301 for this particular graphic 500. Thus, the rendered graphic 500 embodies properties specified by the selected graphic definition 109a or 109b, with no customizations.

As noted above, the presentation model 408 and the semantic model 404 are in-memory representations, and thus shown using dashed lines. Each of these models 404 and 408 include representations corresponding to each of the graphical elements 502, 504, 506, 508 and 510 included in the graphic 500. Specifically, the presentation model 408 includes representations 502', 504', 506', 508' and 510' that correspond to graphical elements 502, 504, 506, 508 and 510, respectively, and maintain properties associated with each respective graphical element. These properties are "presentation" properties that are specific only to the graphic definition 109a or 109b to which the graphic 500 belongs. In the exemplary embodiment for illustrating FIGS. 5A-5C, the size of these graphical elements 502, 504, 506, 508 and 510 constitutes a presentation property.

Likewise, the semantic model 404 includes representations 502", 504", 506", 508" and 510" that correspond to graphical elements 502, 504, 506, 508 and 510, respectively, and maintain properties associated with each respective graphical element. These properties are "semantic" properties that are persistent across all graphic definitions 109a and 109b that may be selected through the gallery pane 105. In the exemplary embodiment for illustrating FIGS. 5A-5C, the color of these graphical elements 502, 504, 506, 508 and 510 constitutes a semantic property.

FIG. 5B illustrates the results of user interaction 310 editing the color of the graphical element 502 and the size of the graphical element 506. Because the color of graphical elements constitutes a semantic property in accordance with the exemplary embodiment described herein, the customization engine 412 updates the representation 502" in the semantic model 404 corresponding to the graphical element 502 to accommodate for the color change. Because the size of graphical elements constitutes a presentation property in accordance with the exemplary embodiment described herein, the customization engine 412 updates the representation 506' in the presentation model 408 corresponding to the graphical element 506 to accommodate for the size change.

FIG. 5C illustrates the rendering on the graphics pane 106 of a graphic 511 corresponding to different graphic definition 109a or 109b than the graphic 500 shown in FIGS. 5A-5B. The graphic 511 includes graphical elements 512, 514, 516, 518 and 520. This graphic 511 is rendered on the graphics pane 106 in response to a user's request through the gallery pane 105 to switch graphic definitions 109a and 109b for viewing the content 115 (e.g., "A," "B," and "C"). In receipt of such a request, the customization engine 412 retrieves the presentation model 410 associated with the new graphic definition 109a or 109b and the semantic model 408.

Because a graphic (e.g., 511) corresponding to the requested graphic definition 109a or 109b has not yet been rendered on the graphics pane 106, a user has not yet had a chance to customize any of the presentation properties. As such, the retrieved presentation model 410 specifies default properties for the graphical elements, according to the associated graphic definition 109a or 109b, and the customization engine 412 creates customization data 301 that does not specify any presentation changes. Thus, because the size change to graphical element 506 is considered for purposes of this illustration a "presentation" change, that particular customization is not persisted to the graphic 511. Indeed, all of the presentation properties specified in the retrieved presentation model 410 are default properties for the selected graphic definition 305. However, because the semantic model 404 has been updated per the semantic change (i.e., color) to the graphic 500 illustrated in FIG. 5B, that particular customization is persisted to the graphic 511.

The examples shown in FIGS. 5A-5C and described above illustrate embodiments of the present invention at a high level. Indeed, color and size of graphical elements embody only two properties that may be defined for graphics using presentation models and a semantic model in accordance with the present invention. As noted above, any other property related to the appearance or layout of graphical elements in a graphic may constitute a presentation property or a semantic property. Such properties include, for example, the position of a graphical element respective to other graphical elements in a graphic, the scaling of a graphical element respective to other graphical elements in a graphic, the font size of textual data within a graphical element, the degree of rotation of a graphical element, the z-order of a graphical element respective to other graphical elements in a graphic and any other possible formatting and layout property that may apply to graphical elements within a graphic or the graphic as a whole.

For example, the position of a graphical element relative to other graphical elements may constitute a presentation or semantic property that is specified by a presentation model or a semantic model, respectively. In either case, the computer graphics application 100 applies customizations by scaling both the x and y offsets applied to the re-positioned graphical element in response to the addition of a new graphical element to the graphic. Alternatively, the x and y offsets embody a radial offset based on polar coordinates. In an embodiment, positional movements relative to graphics that are rectangular in nature (e.g., square, rectangle, etc.) are applied based on x and y offsets, whereas positional movements relative to graphics that are circular in nature (e.g., oval, circle, etc.) are applied based on a radial offset.

For both radial and linear positional customizations, the distance that a graphical element has been moved relative to its default position is stored in either a presentation or a semantic model, depending on whether positional changes are "presentation" or "semantic" changes. As such, these customizations are maintained with the graphic and, if stored as a semantic change, then across graphics corresponding to other graphic definitions, even after modification of the graphic(s). In response to a change to the layout of a graphic (e.g., adding or deleting a graphical element) in which a graphical element has been re-positioned, the computer graphics application 100 determines a new position for the previously re-positioned graphical element based on the stored relative change. For linear customizations, this process involves using the offset of the previously re-positioned graphical element from another graphical element in the graphic. For radial customizations, this process involves using the radius, the shape position angle and angle between graphical elements.

Figure 6:
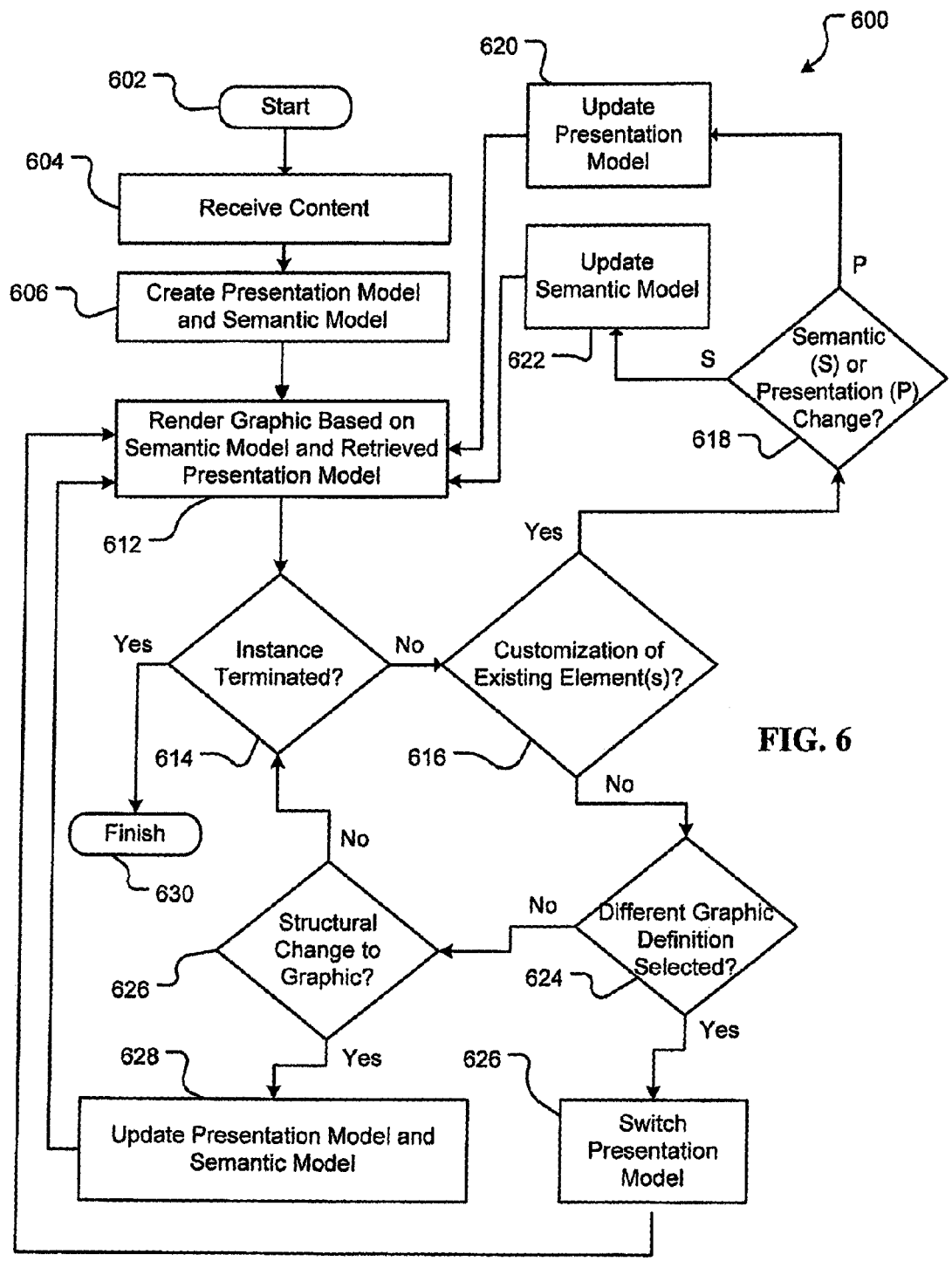
FIG. 6 is a flow diagram illustrating operational characteristics of a process for displaying ("display process") a graphic based on user customizations is shown in accordance with an embodiment of the present invention.

Referring now to FIG. 6, a flow diagram illustrating operational characteristics of embodying a process 600 for displaying graphics based on user customizations is shown in accordance with an embodiment of the present invention. For illustrative purposes, this process 600 is referred to herein as a "display process" and described with reference to the computer graphics application 100 illustrated in FIGS. 1-4. As such, the display process 600 is described herein according to an exemplary embodiment as being performed by the computer graphics program 100 and the various components described in conjunction therewith are described with reference to FIG. 6 using like reference numerals and terminology.

The display process 600 is performed using an operation flow beginning with a start operation 602 and ending with a terminate operation 630. The start operation 602 is initiated in response to a user or another application program launching the computer graphics application 100 to create or edit a graphic 108 representing content 115 entered into the application 100. From the start operation 602, the operation flow passes to a receive content operation 604.

The receive content operation 604 receives the content 115 that the user or application program is requesting to be visually represented in the graphic 108. In an embodiment, this content 115 is textual content, which may or may not be arranged in a format. Exemplary textual content in accordance with this embodiment is a structured list. Also, in an embodiment, the content 115 received by the first receive operation 604 is displayed to a user through the content pane 104 of the user interface 102 for the computer graphics application 100. From the receive content operation 604, the operation flow passes to a create operation 606.

The create operation 606 creates the presentation model 408 or 410 and the semantic model 404 for use with the instance of the computer graphics application 100 launched at the start operation 602. The created semantic model 410 specifies default semantic properties that are persistent across all possible graphic definitions 109a and 109b. The created presentation model 408 or 410 specifies the default presentation properties defined by a selected graphic definition 109a or 109b.

In accordance with an embodiment, the selected graphic definition 109a or 109b on which the created presentation model 408 or 410 is based is a default graphic definition, e.g., 109a or 109b, predetermined for all instances of the computer graphics application 100. In this embodiment, the computer graphics application 100 is pre-programmed such that initiation of the application 100 renders a selection of the default graphic definition 109a or 109b for use by the user until the user requests a graphic switch to another graphic definition 109a or 109b. In accordance with an alternative embodiment, the computer graphics application 100 may present the user with a selection screen (e.g., UI dialog) that allows the user to select a specific graphic definition 109a or 109b for rendering an initial graphic 108 within the graphics pane 106. As such, the create operation 606 creates the presentation model 408 or 410 based on the selected graphic definition 109a or 109b.

After the presentation model 408 or 410 and the semantic model 404 have been created, the operation flow passes in sequence to a render operation 612. The render operation 612 renders the graphic 108 on a display screen for viewing and editing by a user. The visual characteristics (i.e., layout and appearance of graphical elements) of the graphic 108 are defined by the render operation 612 based on the property specifications in the semantic model 404 and the presentation model 408 or 410 created by the create operation 606. As described above, the semantic model 404 is not only used to define certain visual properties, i.e., "semantic properties," for the graphic 108 displayed by the render operation 612, but all graphics 108 belonging to all graphic definitions 109a and 109b that may be rendered in the computer graphics application 100. In contrast, however, the presentation model 408 or 410 is used only to define certain visual properties, i.e., "presentation properties," for the graphic 108 being rendered and for none other. Indeed, a graphic 108 corresponding to the other graphic definition 109a or 109b takes on only those the presentation properties specified in the presentation model 408 or 410 corresponding to that graphic definition 109a or 109b. After the graphic 108 is rendered on the display screen, the operation flow passes to a first query operation 614.

The first query operation 614 determines whether the instance of the computer graphics application 100 launched to invoke the start operation 602 has been terminated, thereby signifying that no further input regarding content, customizations or selection of graphic definitions 109a and 109b will be received unless the computer graphics application 100 is subsequently invoked to create a new instance.

If the instance has been terminated, the operation flow concludes at the terminate operation 630. Otherwise, the operation flow branches "No" to a second query operation 616. The second query operation 616 determines whether the graphic 108 currently rendered in the graphics pane 106 has been edited (i.e., customized) in any fashion. If so, the second query operation 616 branches the operation flow "Yes" to a third query operation 618. Otherwise, the second query operation 616 branches the operation flow "No" to a fourth query operation 624.

The third query operation 618 examines the customization detected by the second query operation 616 to determine whether the customization relates to a presentation change or a semantic change. As noted repeatedly above, a presentation change is a change that is intended to only affect the specific graphic definition 109a or 109b that the graphic 108 currently being rendered corresponds to. In contrast, a semantic change is a change that is intended to affect all graphic definitions 109a and 109b that may be selected by the computer graphics application 100. Any property that may relate to a graphic (e.g., 108), or graphical elements thereof, may be labeled either a presentation property, and thus subjected to presentation changes, or a semantic property, and thus subject to semantic changes. The implementation is a matter of choice, and for illustrative purposes only, the size of a graphical element is being described herein as an exemplary presentation property and the color of a graphical element is being described herein as an exemplary semantic property.

If the third query operation 618 determines that the customization is a presentation change, the operation flow is branched "P" to a first update operation 620. The first update operation 620 updates the retrieved presentation model 408 or 410 with the customization. On the other hand, if the third query operation 618 determines that the customization is a semantic change, the operation flow is branched "S" to a second update operation 622. The second update operation 622 updates the semantic model 404 created by the create operation 606 with the customization. From both the first update operation 620 and the second update operation 622, the operation flow passes back to the render operation 612, which renders the graphic 108 based on the updated model (i.e., either the presentation model or the semantic model). The operation flow then continues as previously described.

In circumstances when the second query operation 616 branches the operation flow "No," the fourth query operation 624 is invoked. The fourth query operation 624 determines whether a user or another application program has selected a new graphic definition 109a or 109b for display on the graphics pane 106. Such a selection is interpreted as the user or other application program desiring to view the content 115 received in receive operation 604 based on a different graphic definition 109a or 109b. If the fourth query operation 624 determines that such a selection has been made, the operation flow passes to a switch operation 626.

The switch operation 626 creates the presentation model 408 or 410 (or, retrieves, if this presentation model has already been created) associated with the new selected graphic definition 109a or 109b and then passes the operation flow back to the render operation 612. The render operation 612 then renders the graphic 108 based on the current semantic model 404 (i.e., either the semantic model created by the create operation 606 or an updated version of same) and the presentation model 408 or 410 created or retrieved by the switch operation 626.

However, if the fourth query operation 624 determines that the selection of a new graphic definition 109a or 109b has not occurred, the operation flow branches "No" to a fifth query operation 627. The fifth query operation 627 determines whether a user or another application program has input information resulting in a change to the structure of the content 115. Such a change in structure may result from the addition or deletion of content that did (if removed) or would (if added) correspond to a graphical element in the graphic 108. Such removal or deletion may include formatting changes that result in the addition or deletion of graphical elements. If the fifth query operation 627 detects a change in the content 115 that will result in a structural change to the graphic 108, the operation flow is branched "Yes" to an third update operation 628. Otherwise, the operation flow branches "No" to the first query operation 614 and continues as previously described.

The third update operation 628 updates both the presentation model 408 or 410 currently in use (i.e., either the presentation model created by the create operation 606 or a presentation model created or retrieved by the switch operation 626) and the semantic model 404 to reflect the changes to the content 115. From the third update operation 628, the operation flow passes to the render operation 612, which renders the graphic 108 based on the updated presentation model 408 or 410 and the updated semantic model 404. From the render operation 612, the operation flow continues as previously described.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. For example, the sequence of performance of operations within the display process 600 is shown in accordance with an exemplary embodiment. In accordance with other embodiments, the sequence of performance of these operations may be altered. For instance, the create operation 606 may be performed in time prior to the retrieve content operation 604 without departing from the scope of the present invention.

Additionally, while a 1:1 correlation between presentation models (e.g., 408 and 410) and graphic definitions (e.g., 109*a* and 109*b*) is described, more than one presentation model (e.g., 408 and 410) may be associated with a single graphic definition 109*a* or 109*b* in accordance with an embodiment of the present invention. Furthermore, it should be appreciated that the UI 102 may be constructed to have less than or more than three panes (e.g., 104, 105 and 106). Indeed, the functionality on any one of these panes (e.g., 104, 105 and 106) may be alternatively or additionally provided in other types of graphical user interface components, such as, for example, toolbars, thumbnails, menu bars, command lines, dialog boxes, etc.

Even further, while the presentation models (e.g., 408, 410) are described herein as being specific to each graphic definition, e.g., 109*a* and 109*b*, other embodiments contemplated within the scope of the present invention relate to presentation models (e.g., 408, 410) being persisted across multiple graphic definitions 306. In these embodiments, graphic definitions, e.g., 109*a* and 109*b*, having similar characteristics are grouped together in graphic classifications and the presentation models are specific to these classifications rather than individually to the types making up the classifications. For example, a classification may group together all graphic definitions, e.g., 109*a* and 109*b*, having graphical elements operable for positional movement in a radial manner in order to persist these movements across all graphic definitions in this classification. Likewise, another classification may group together all graphic definitions, e.g., 109*a* and 109*b*, operable for positional movement relative to an x-y coordinate system.

What is claimed is:

1. A computer-implemented method for creating graphical content, comprising:
    receiving a first line of text and a second line of text in a content entry area;
    receiving one or more formats in addition to the first line of text and the second line of text;
    in response to receiving the one or more formats, determining a hierarchical relationship between the first line of text and the second line of text based on the one or more formats;
    receiving a selection of a graphical layout definition, wherein the graphical layout definition defines a graphical layout for the graphical content;
    creating the graphical content in a drawing canvas that is separate from the content entry area, wherein the creating comprises:
        combining the first line of text with the graphical layout definition to generate a first shape, the first shape at least substantially encapsulating the first line of text;
        combining the second line of text with the graphical layout definition to generate a second shape, the second shape at least substantially encapsulating the second line of text;
        displaying a transition between the first shape and the second shape, the transition representing the hierarchical relationship between the first line of text and the second line of text;
        displaying the first line of text and the second line of text in the content entry area; and
        displaying the graphical content having the first shape and the second shape in the drawing canvas area.

2. The computer-implemented method according to claim 1, wherein one or more changes are displayed in the graphical content as the one or more formats are received.

3. The computer-implemented method according to claim 1, wherein the first line of text and the second line of text are a hierarchical list.

4. The computer-implemented method according to claim 1, wherein the graphical content is based on the first line of text, the second line of text, and a default graphical layout definition.

5. The computer-implemented method according to claim 1, further comprising a style gallery area for selecting one or more of a plurality of graphical style definitions to be combined with the first line of text and the second line of text, wherein each of the plurality of graphical style definitions defines a graphical style for the graphical content.

6. The computer-implemented method according to claim 1, wherein the graphical layout definition is selected from the group consisting of a hierarchical diagram, a process diagram, a cycle diagram, a relationship diagram, and a pyramid diagram.

7. The computer-implemented method according to claim 1, wherein the first line of text and the second line of text are linked to information in another application.

8. A system for editing graphical content, comprising:
    at least one processor; and
    at least one memory, communicatively coupled to the at least one processor and containing instructions that, when executed by the at least one processor, perform a method comprising:
        receiving content in a content entry area, wherein the content includes a plurality of portions of the content;
        receiving one or more formats to the content, wherein the one or more formats comprise at least one of: a carriage return, an indent, a tab, a bullet, a text formatting, and a line spacing;
in response to receiving the one or more formats, determining relationships between the plurality of portions of the content based on the one or more formats;
displaying the graphical content in a drawing canvas area, the displaying comprising:
combining a first portion of content with a first graphical definition selected from a gallery area to display a first shape, the first shape at least substantially encapsulating the first portion of content;
combining a second portion of content with the first graphical definition to display a second shape, the second shape at least substantially encapsulating the second portion of content;
displaying a graphical line between the first shape and the second shape, the graphical line representing a relationship between the first portion of content and the second portion of content;
receiving one or more changes to the graphical content in the drawing canvas area, wherein the one or more changes comprise modifying at least one of: the first shape and the second shape;
creating corresponding modifications to at least one of: the first portion of content and the second portion of content in the content entry area; and
displaying the at least one modified first shape or second shape of the graphical content in the drawing canvas area and the at least one correspondingly modified first portion of content or second portion of content in the content entry area.

9. The system according to claim 8, wherein the one or more changes are to the first portion of content or the second portion of content in the content entry area.

10. The system according to claim 8, further comprising:
receiving a selection of a second graphical definition; and
displaying modified graphical content in the drawing canvas area, comprising:
combining the first portion of content with the second graphical definition to display a third shape, the third shape at least substantially encapsulating the first portion of content;
combining the second portion of content with the second graphical definition to display a fourth shape, the fourth shape at least substantially encapsulating the second portion of content; and
displaying the graphical line between the third shape and the fourth shape, the graphical line representing the relationship between the first portion of content and the second portion of content.

11. The system according to claim 8, wherein the one or more changes are made directly to the graphical line in the drawing canvas area and the corresponding modifications are to the one or more formats in the content entry area.

12. The system according to claim 8, wherein the first graphical definition comprises one of a hierarchical diagram, process diagram, cycle diagram, relationship diagram, and pyramid diagram.

13. A computing device comprising at least one memory and at least one processing unit operable to execute instructions for performing a method of creating a first graphical diagram, the method comprising:
receiving a first line of text and a second line of text in a content entry area;
receiving one or more formats in addition to the first line of text and the second line of text;
in response to receiving the one or more formats, determining a hierarchical relationship between the first line of text and the second line of text based on the one or more formats;
receiving a selection of a first graphical layout from a layout gallery displaying a plurality of graphical layouts for creating the first graphical diagram; and
creating the first graphical diagram in a drawing canvas that is separate from the content entry area and the layout gallery, wherein the creating comprising:
combining the first line of text with the first graphical layout to generate a first shape, the first shape at least substantially encapsulating the first line of text;
combining the second line of text with the first graphical layout to generate a second shape, the second shape at least substantially encapsulating the second line of text;
displaying a transition between the first shape and the second shape, the transition representing the hierarchical relationship between the first line of text and the second line of text;
displaying the first line of text and the second line of text in the content entry area; and
displaying the first graphical diagram having the first shape and the second shape in the drawing canvas area.

14. The computing device according to claim 13, further comprising:
receiving a first customization to a presentation property of the first shape; and
updating the presentation property of the first shape with the first customization.

15. The computing device according to claim 14, further comprising:
receiving a second customization to a semantic property of the first shape; and
updating the semantic property of the first shape with the second customization.

16. The computing device according to claim 15, further comprising:
receiving a selection of a second graphical layout; and
in response to the selection of the second graphical layout, rendering a second graphical diagram comprising a first shape that includes the first line of text and the updated semantic property but not the updated presentation property.

17. The computing device according to claim 13, further comprising a style gallery area for selecting one or more of a plurality of graphical styles to be combined with the first line of text and the second line of text to create the first graphical diagram.

18. The computing device according to claim 13, wherein the first graphical diagram comprises one of a hierarchical diagram, a process diagram, a cycle diagram, a relationship diagram, and a pyramid diagram.

19. The computing device according to claim 13, wherein the first line of text and the second line of text are linked to information in another application.

20. The computing device according to claim 13, wherein one or more changes are made to the graphical line in the drawing canvas area and the corresponding modifications are to the one or more formats in the content entry area.

* * * * *